US011423909B2

(12) United States Patent
Sommers et al.

(10) Patent No.: US 11,423,909 B2
(45) Date of Patent: *Aug. 23, 2022

(54) WORD FLOW ANNOTATION

(71) Applicant: Magic Leap, Inc., Plantation, FL (US)

(72) Inventors: Jeffrey Scott Sommers, Mountain View, CA (US); Jennifer M. R. Devine, Plantation, FL (US); Joseph Wayne Seuck, Tamarac, FL (US); Adrian Kaehler, Los Angeles, CA (US)

(73) Assignee: Magic Leap, Inc., Plantation, FL (US)

( * ) Notice: Subject to any disclaimer, the term of this patent is extended or adjusted under 35 U.S.C. 154(b) by 217 days.

This patent is subject to a terminal disclaimer.

(21) Appl. No.: 16/791,855

(22) Filed: Feb. 14, 2020

(65) Prior Publication Data

US 2020/0184975 A1 Jun. 11, 2020

Related U.S. Application Data

(63) Continuation of application No. 15/673,894, filed on Aug. 10, 2017, now Pat. No. 10,607,609.
(Continued)

(51) Int. Cl.
*G10L 15/26* (2006.01)
*G06F 40/58* (2020.01)
(Continued)

(52) U.S. Cl.
CPC ............ *G10L 15/26* (2013.01); *G06F 40/169* (2020.01); *G06F 40/242* (2020.01); *G06F 40/58* (2020.01);
(Continued)

(58) Field of Classification Search
CPC ....... G06F 3/013; G06F 17/241; G10L 15/00; G10L 15/04; G10L 15/22; G10L 15/26; G06K 9/00
See application file for complete search history.

(56) References Cited

U.S. PATENT DOCUMENTS 6,850,221 B1 2/2005 Tickle
8,950,867 B2 2/2015 Macnamara
(Continued)

FOREIGN PATENT DOCUMENTS

EP 1 110 156 6/2001
JP 2005-115289 A 4/2005
(Continued)

OTHER PUBLICATIONS

Ikenobu, et al., "Development of Multilingual Conversation Presumption Support Systems using Utterance Visualization," The Institute of Electronics, Information and Communication Engineers, IEICE Technical Report, AI2010-49 (Feb. 2011).
(Continued)

*Primary Examiner* — Paras D Shah
(74) *Attorney, Agent, or Firm* — Knobbe, Martens, Olson & Bear, LLP

(57) ABSTRACT

An augmented reality (AR) device can be configured to monitor ambient audio data. The AR device can detect speech in the ambient audio data, convert the detected speech into text, or detect keywords such as rare words in the speech. When a rare word is detected, the AR device can retrieve auxiliary information (e.g., a definition) related to the rare word from a public or private source. The AR device can display the auxiliary information for a user to help the user better understand the speech. The AR device may perform translation of foreign speech, may display text (or the translation) of a speaker's speech to the user, or display statistical or other information associated with the speech.

21 Claims, 25 Drawing Sheets

Related U.S. Application Data

(60) Provisional application No. 62/374,183, filed on Aug. 12, 2016.

(51) Int. Cl.
| | |
|---|---|
| *G06F 40/169* | (2020.01) |
| *G06F 40/242* | (2020.01) |
| *G06V 20/20* | (2022.01) |
| *G10L 15/18* | (2013.01) |
| *G10L 25/84* | (2013.01) |
| *H04N 7/15* | (2006.01) |
| *H04N 7/14* | (2006.01) |
| *G10L 15/08* | (2006.01) |

(52) U.S. Cl.
CPC .......... *G06V 20/20* (2022.01); *G10L 15/1815* (2013.01); *G10L 25/84* (2013.01); *H04N 7/157* (2013.01); *G10L 2015/088* (2013.01); *H04N 7/142* (2013.01)

(56) References Cited

U.S. PATENT DOCUMENTS

| | | | |
|---|---|---|---|
| 8,953,889 B1 * | 2/2015 | Worley, III | G06F 16/289 |
| | | | 382/190 |
| 9,081,426 B2 | 7/2015 | Armstrong | |
| 9,215,293 B2 | 12/2015 | Miller | |
| 9,275,637 B1 * | 3/2016 | Salvador | G10L 15/06 |
| 9,310,559 B2 | 4/2016 | Macnamara | |
| 9,330,499 B2 | 5/2016 | Perez et al. | |
| 9,348,143 B2 | 5/2016 | Gao et al. | |
| 9,417,452 B2 | 8/2016 | Schowengerdt et al. | |
| 9,470,906 B2 | 10/2016 | Kaji et al. | |
| 9,547,174 B2 | 1/2017 | Gao et al. | |
| 9,671,566 B2 | 6/2017 | Abovitz et al. | |
| 9,740,006 B2 | 8/2017 | Gao | |
| 9,791,700 B2 | 10/2017 | Schowengerdt et al. | |
| 9,851,563 B2 | 12/2017 | Gao et al. | |
| 9,857,591 B2 | 1/2018 | Welch et al. | |
| 9,874,749 B2 | 1/2018 | Bradski | |
| 9,990,034 B2 * | 6/2018 | Lee | G06F 3/1423 |
| 10,042,038 B1 | 8/2018 | Lord | |
| 10,209,514 B2 * | 2/2019 | Kang | G02B 27/017 |
| 10,607,609 B2 | 3/2020 | Sommers et al. | |
| 2003/0088562 A1 | 5/2003 | Dillon et al. | |
| 2005/0234724 A1 | 10/2005 | Aaron et al. | |
| 2006/0028436 A1 | 2/2006 | Armstrong | |
| 2007/0081123 A1 | 4/2007 | Lewis | |
| 2009/0177463 A1 | 7/2009 | Gallagher et al. | |
| 2010/0023476 A1 | 1/2010 | Cannon et al. | |
| 2010/0145702 A1 | 6/2010 | Karmarkar | |
| 2011/0166860 A1 | 7/2011 | Tran | |
| 2011/0231379 A1 * | 9/2011 | Kruglick | G06N 5/04 |
| | | | 707/706 |
| 2012/0036540 A1 | 2/2012 | Lee et al. | |
| 2012/0127062 A1 | 5/2012 | Bar-Zeev et al. | |
| 2012/0162549 A1 | 6/2012 | Gao et al. | |
| 2013/0082922 A1 | 4/2013 | Miller | |
| 2013/0117377 A1 | 5/2013 | Miller | |
| 2013/0125027 A1 | 5/2013 | Abovitz | |
| 2013/0208234 A1 | 8/2013 | Lewis | |
| 2013/0242262 A1 | 9/2013 | Lewis | |
| 2014/0003762 A1 | 1/2014 | Macnamara | |
| 2014/0071539 A1 | 3/2014 | Gao | |
| 2014/0081634 A1 | 3/2014 | Forutanpour et al. | |
| 2014/0177023 A1 | 6/2014 | Gao et al. | |
| 2014/0218468 A1 | 8/2014 | Gao et al. | |
| 2014/0223279 A1 | 8/2014 | Algreatly | |
| 2014/0267420 A1 | 9/2014 | Schowengerdt | |
| 2014/0306866 A1 | 10/2014 | Miller et al. | |
| 2014/0344661 A1 | 11/2014 | Sipe et al. | |
| 2015/0016777 A1 | 1/2015 | Abovitz et al. | |
| 2015/0100875 A1 * | 4/2015 | Kim | G06F 40/171 |
| | | | 715/232 |
| 2015/0103306 A1 | 4/2015 | Kaji et al. | |
| 2015/0178939 A1 | 6/2015 | Bradski et al. | |
| 2015/0205126 A1 | 7/2015 | Schowengerdt | |
| 2015/0222883 A1 | 8/2015 | Welch | |
| 2015/0222884 A1 | 8/2015 | Cheng | |
| 2015/0242383 A1 | 8/2015 | Arputharaj et al. | |
| 2015/0268415 A1 | 9/2015 | Schowengerdt et al. | |
| 2015/0302652 A1 | 10/2015 | Miller et al. | |
| 2015/0309263 A2 | 10/2015 | Abovitz et al. | |
| 2015/0325050 A1 | 11/2015 | Roh et al. | |
| 2015/0326570 A1 | 11/2015 | Publicover et al. | |
| 2015/0346490 A1 | 12/2015 | TeKolste et al. | |
| 2015/0346495 A1 | 12/2015 | Welch et al. | |
| 2015/0348549 A1 | 12/2015 | Giuli et al. | |
| 2016/0011419 A1 | 1/2016 | Gao | |
| 2016/0021360 A1 * | 1/2016 | Nishizawa | H04N 13/344 |
| | | | 348/53 |
| 2016/0026253 A1 | 1/2016 | Bradski et al. | |
| 2016/0070792 A1 * | 3/2016 | Yuan | G06F 40/274 |
| | | | 707/770 |
| 2016/0093296 A1 | 3/2016 | Bangalore | |
| 2016/0093298 A1 | 3/2016 | Naik et al. | |
| 2016/0232706 A1 | 8/2016 | Herman | |
| 2016/0283020 A1 | 9/2016 | Heo et al. | |
| 2016/0321841 A1 | 11/2016 | Christen et al. | |
| 2017/0011289 A1 | 1/2017 | Gao et al. | |
| 2017/0075877 A1 | 3/2017 | Lepeltier | |
| 2017/0187711 A1 | 6/2017 | Joo et al. | |
| 2018/0047395 A1 | 2/2018 | Sommers et al. | |
| 2018/0314406 A1 | 11/2018 | Powderly | |

FOREIGN PATENT DOCUMENTS

| | | |
|---|---|---|
| JP | 2009-123001 A | 6/2009 |
| JP | 2010-108099 A | 5/2010 |
| JP | 2011-118531 | 6/2011 |
| JP | 2011-248860 | 12/2011 |
| JP | 2012-164113 A | 8/2012 |
| JP | 2013-218597 A | 10/2013 |
| JP | 2014-186089 A | 10/2014 |
| JP | 2015-118710 A | 6/2015 |
| JP | 2016-045723 A | 4/2016 |
| KR | 2016-0030996 | 3/2016 |
| WO | WO 2001/04792 | 1/2001 |
| WO | WO 2018/031745 | 2/2018 |

OTHER PUBLICATIONS

ARToolKit: https://web.archive.org/web/20051013062315/http://www.hitl.washington.edu:80/artoolkit/documentation/hardware.htm, archived Oct. 13, 2005.

Azuma, "a Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Jacob, "Eye Tracking in Advanced interface Design," Human-Computer Interaction Lab Naval Research Laboratory, Washington, D.C. / paper/ in Virtual Environments and Advanced interface Design, ed. by W. Barfield and T.A. Furness, pp. 258-288, Oxford University Press, New York (1995).

Tanriverdi and Jacob, "interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

European Extended Search Report, re EP Application No. 17840260, dated Nov. 26, 2019.

Invitation to Pay Additional Fees and, Where Applicable, Protest Fee for PCT Application No. PCT/US2017/046251, dated Oct. 4, 2017.

(56) References Cited

OTHER PUBLICATIONS

International Search Report and Written Opinion for PCT Application No. PCT/US2017/046251, dated Dec. 4, 2017.
International Preliminary Report for PCT Application No. PCT/US2017/046251, dated Feb. 12, 2019.
"Automatic translation and Microsoft Translator", Microsoft, accessed Apr. 28, 2016, in 6 pages. URL: https://www.microsoft.com/enus/translator/at.asp.
"Cloud Speech API Alpha—Speech to te t conversion powered by machine learning", Google Cloud Platform, accessed Apr. 28, 2016, in 6 pages. URL: https://cloud.google.com/speech/?utm_source=google&utm_medium=cpc&utm_campaign=2015%ADq2%ADcloud%ADna%ADsolutions%ADbkws%ADfreetrial%ADen&gclid=Cj0KEQjw6Ya.
Apostolico, A. et al., "Efficient Detection of Unusual Words", Computer Science Technical Reports, paper 1386, Nov. 1997, in 18 pages. URL: http://docs.lib.purdue.edu/cstech/1386.
Deng, L. et al., "Recent Advances in Deep Learning for Speech Research at Microsoft", IEEE International Conference on Acoustics, Speech, and Signal Processing (ICASSP), May 2013, in 5 pages. URL: https://www.microsoft.com/en-us/research/publication/recent-advances-in-deep-learning-for-speech-research-at-microsoft/.
Graves, A. et al., "Towards End-to-End Speech Recognition with Recurrent Neural Networks", Proceedings of the 31st International Conference on Machine Learning, vol. 32, Jun. 2014, in 9 pages.
Povey, D. et al., "The Kaldi Speech Recognition Toolkit", IEEE ASRU, Jan. 2011, in 4 pages.
Wikipedia: "Machine Translation", Wikipedia, printed Apr. 28, 2016, in 14 pages. URL: https://en.wikipedia.org/wiki/Machine_translation.
Wikipedia: "Speech Recognition", Wikipedia, accessed Jun. 10, 2016, in 19 pages. URL: https://en.wikipedia.org/wiki/Speech_recognition.

* cited by examiner

WORD FLOW ANNOTATION

CROSS-REFERENCE TO RELATED APPLICATIONS

This application is a continuation of U.S. application Ser. No. 15/673,894, filed on Aug. 10, 2017, entitled "WORD FLOW ANNOTATION," and claims the benefit of priority under 35 U.S.C. § 119(e) to U.S. Provisional Application No. 62/374,183, filed on Aug. 12, 2016, entitled "WORD FLOW ANNOTATION," the disclosures of each of which are hereby incorporated by reference herein in its entirety.

FIELD

The present disclosure relates to virtual reality and augmented reality imaging and visualization systems and more particularly to generating a visual annotation of speech to enhance understanding of the speech by a user of the systems.

BACKGROUND

Modern computing and display technologies have facilitated the development of systems for so called "virtual reality", "augmented reality", or "mixed reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user; a mixed reality, or "MR", related to merging real and virtual worlds to produce new environments where physical and virtual objects co-exist and interact in real time. As it turns out, the human visual perception system is very complex, and producing a VR, AR, or MR technology that facilitates a comfortable, natural-feeling, rich presentation of virtual image elements amongst other virtual or real-world imagery elements is challenging. Systems and methods disclosed herein address various challenges related to VR, AR and MR technology.

SUMMARY

Various embodiments of a mixed reality system for providing explanation or information on objects of interest (e.g., new or unknown words to a listener) in (or near) real-time with a minimal level of distraction to, and an insignificant level of effort by, the listener are disclosed.

In some embodiments, an augmented reality (AR) system can comprise an AR display configured to present virtual content to a user of the AR system; an audio sensor configured to capture ambient sounds; and a hardware processor in communication with the AR display and the audio sensor. The hardware processor can be programmed to: receive the ambient sounds captured by the audio sensor; detect presence of a speech in the ambient sounds; convert the detected speech to text; detect a rare word in the speech; retrieve auxiliary information associated with the rare word; and cause the AR display to render the retrieved auxiliary information.

In some embodiments, a method can be performed under control of an augmented reality (AR) device comprising a hardware processor and an AR display configured to present virtual content in an environment of a user. The method comprises monitoring the environment of the user of the AR device; detecting presence of an object of interest in the environment based on contextual information associated with at least one of the user or the environment; retrieving auxiliary information for the object of interest; determining a display position of the auxiliary information in a field of view of the user, wherein the field of view comprises a portion of the environment which a user can perceive at a given time; and causing the AR display to render the auxiliary information at the display position.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

Figure 1:
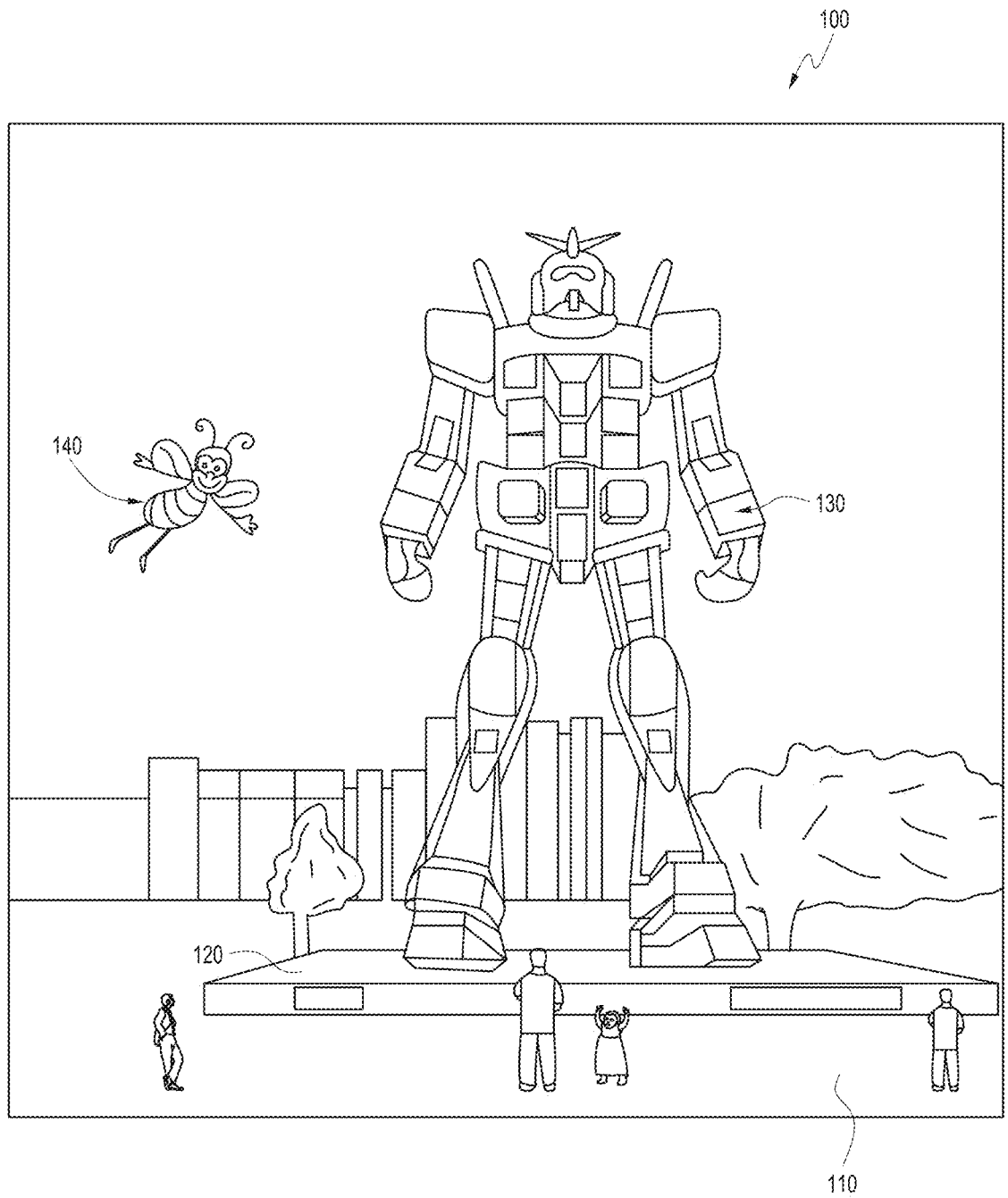
FIG. 1 depicts an illustration of a mixed reality scenario with certain virtual reality objects, and certain physical objects viewed by a person.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

It is common in everyday speech in the modern world to encounter names or references which are new to a listener because they refer to uncommon ideas or concepts, ideas or concepts from a specific problem domain, or because they are proper references to persons or things unknown to the listener. A listener may not know certain words simply due to a lack of familiarity or knowledge. Naturally, this can impede conversation, and lead to embarrassment, confusion, or misunderstanding.

It may be desirable to have an augmented reality system which can provide explanation or information on new or unknown words in (or near) real-time with a minimal level of distraction to, and an insignificant level of effort by, a listener.

The present disclosure discloses examples of such desirable systems in the context of an augmented reality device (ARD). Such a device can allow a user to visually receive information which is provided by a computing device in such a manner that the information is simultaneously viewable alongside (or on top of) the normally viewable real world. Such a system can be used to display any form of information that can be displayed on a traditional computer screen such as characters, image effects, text, graphics, or video of any kind. The ARD can include an AR display which can be a see-through display worn in front of the eye or eyes or a VR display. The ARD can also include an audio sensor which can capture audio information, including speech by the user or other persons in the user's environment.

The ARD can implement a word flow annotation system. The world flow annotation system can combine speech recognition, rare word detection, and display capability of an ARD to provide a user with auxiliary information appropriate to the word or to the user. As an example, the ARD for a first user can receive the audio information via a network during a telepresence session in which the first user is communicating with a second user. The word flow annotation system can detect speech in the audio information from the second user and can convert detected speech to text, search for a rare word in the converted text, and retrieve auxiliary information associated with a detected rare word. The ARD can display the auxiliary information on an AR display of the ARD. The system can also dismiss the display of the auxiliary information after a threshold time period has elapsed or when the system detects another rare word, which advantageously may reduce the level of distraction to the first user while still providing helpful auxiliary information about the rare word. For rare dictionary words, the meaning (e.g., a definition) of the word can be displayed. For rare proper nouns (e.g., geographical regions, names of persons, etc.), relevant information from an appropriate source (e.g., an encyclopedia) can be displayed. The kinds of annotations that the system can provide can be as unlimited as the vast array of available information resources, e.g., on the Internet. In some implementations, the system displays the converted text (additionally or alternatively to the information about the rare words) to the wearer of the display, e.g., in the form of a caption or a speech bubble (also sometimes referred to as a call-out box) near the speaker of the text. In some implementations, the display of the auxiliary information is visual (e.g., the captions or speech bubbles previously mentioned); however, in other implementations, additionally or alternatively to the visual display, the auxiliary information can be presented audibly to the user (which may be advantageous for visually impaired users).

In addition to or as an alternative to rare words, similar techniques can also be applied to other keywords, even though some of these keywords may not be rare. The ARD can detect an object of interest in the user's environment (e.g., an object which a user does not typically encounter) and display auxiliary information relating to the object of interest. The keywords and the rare words described herein can include a single word, a phrase, or a sentence.

Further, a conversation often involves multiple topics. The ARD can identify the keywords in a conversation and identify topics in the conversation based on keywords. The ARD can separate texts associated with the conversation into different contextual threads with each thread corresponding to one or more topics. Advantageously, this can facilitate a user's understanding of ideas and points involved in a conversation, because the ARD can provide a user interface (UI) that presents the different contextual threads differently (e.g., on opposing sides of the AR display).

Examples of 3D Display of a Wearable System

A wearable system (also referred to herein as an augmented reality (AR) system) can be configured to present 2D or 3D virtual images to a user. The images may be still images, frames of a video, or a video, in combination or the like. At least a portion of the wearable system can be implemented on a wearable device that can present a VR, AR, or MR environment, alone or in combination, for user interaction. The wearable device can be a head-mounted device (HMD) which is used interchangeably as an AR device (ARD). Further, for the purpose of the present disclosure, the term "AR" is used interchangeably with the term "MR".

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth.

Figure 2:
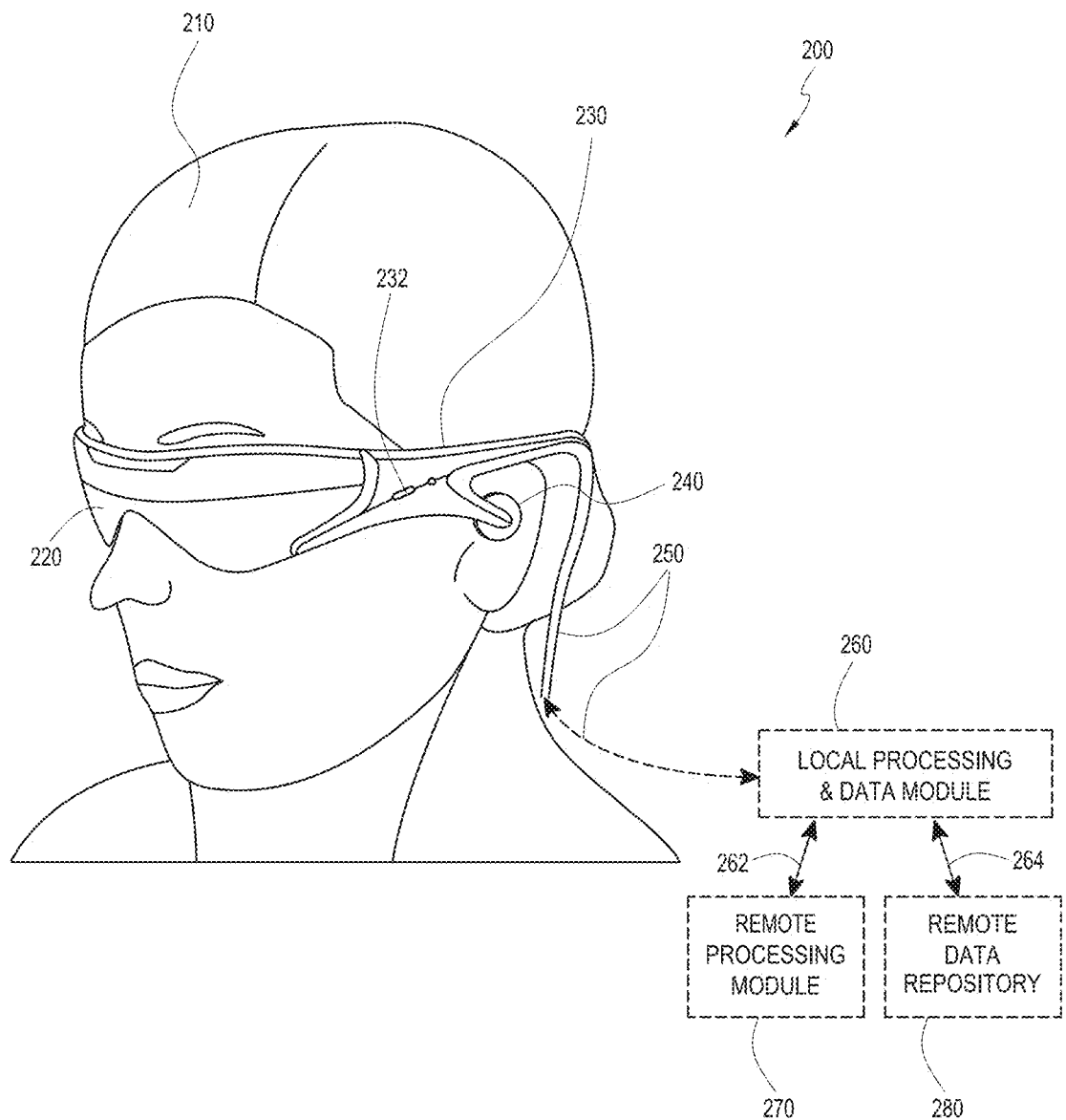
FIG. 2 schematically illustrates an example of a wearable system which can implement an embodiment of a word flow annotation system.

FIG. 2 illustrates an example of wearable system 200 which can be configured to provide an AR/VR/MR scene and can include embodiments of the word flow annotation system described herein. The wearable system 200 can also be referred to as the AR system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display that is worn on the head of the user. In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control). The display 220 can include an audio sensor (e.g., a microphone) 232 for detecting an audio stream from the environment and capture ambient sound. In some embodiments, one or more other audio sensors, not shown, are positioned to provide stereo sound reception. Stereo sound reception can be used to determine the location of a sound source. The wearable system 200 can perform voice or speech recognition on the audio stream.

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 or 270, which may process image information acquired by the inward-facing imaging system to determine, e.g., the pupil diameters or orientations of the eyes, eye movements or eye pose of the user 210.

As an example, the wearable system 200 can use the outward-facing imaging system 464 or the inward-facing imaging system 462 to acquire images of a pose of the user. The images may be still images, frames of a video, or a video.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), audio sensors (e.g., microphones), inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 280 and remote data repository 280 may be operatively coupled to each other.

In some embodiments, the remote processing module 270 may comprise one or more processors configured to analyze and process data or image information. In some embodiments, the remote data repository 280 may comprise a digital data storage facility, which may be available through the internet or other networking configuration in a "cloud" resource configuration. In some embodiments, all data is stored and all computations are performed in the local processing and data module, allowing fully autonomous use from a remote module.

The human visual system is complicated and providing a realistic perception of depth is challenging. Without being limited by theory, it is believed that viewers of an object may perceive the object as being three-dimensional due to a combination of vergence and accommodation. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Figure 3:
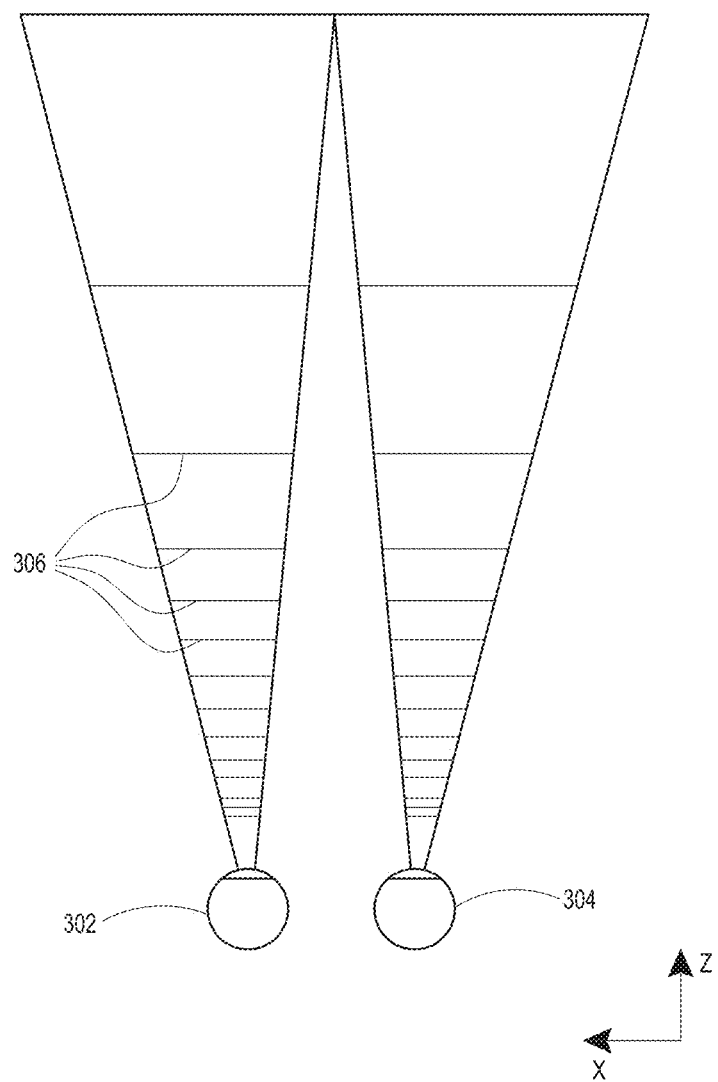
FIG. 3 schematically illustrates aspects of an approach for simulating three-dimensional imagery using multiple depth planes.

FIG. 3 illustrates aspects of an approach for simulating a three-dimensional imagery using multiple depth planes. With reference to FIG. 3, objects at various distances from eyes 302 and 304 on the z-axis are accommodated by the eyes 302 and 304 so that those objects are in focus. The eyes 302 and 304 assume particular accommodated states to bring into focus objects at different distances along the z-axis. Consequently, a particular accommodated state may be said to be associated with a particular one of depth planes 306, which has an associated focal distance, such that objects or parts of objects in a particular depth plane are in focus when the eye is in the accommodated state for that depth plane. In some embodiments, three-dimensional imagery may be simulated by providing different presentations of an image for each of the eyes 302 and 304, and also by providing different presentations of the image corresponding to each of the depth planes. While shown as being separate for clarity of illustration, it will be appreciated that the fields of view of the eyes 302 and 304 may overlap, for example, as distance along the z-axis increases. In addition, while shown as flat for the ease of illustration, it will be appreciated that the contours of a depth plane may be curved in physical space, such that all features in a depth plane are in focus with the eye in a particular accommodated state. Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

Waveguide Stack Assembly

Figure 4:
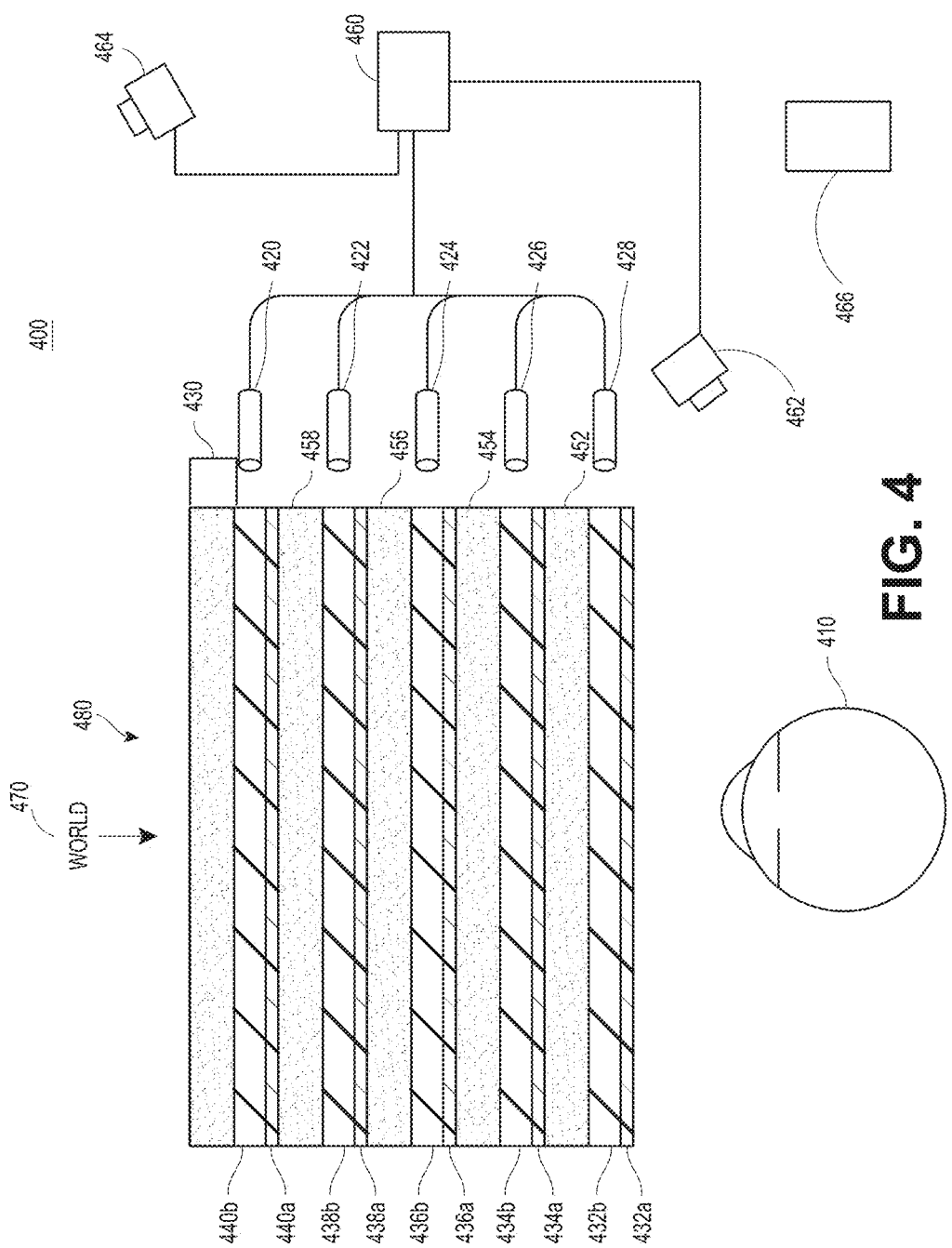
FIG. 4 schematically illustrates an example of a waveguide stack for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432b, 434b, 436b, 438b, 4400b. In some embodiments, the wearable system 400 may correspond to wearable system 200 of FIG. 2, with FIG. 4 schematically showing some parts of that wearable system 200 in greater detail. For example, in some embodiments, the waveguide assembly 480 may be integrated into the display 220 of FIG. 2.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers or structures for forming air gaps).

The waveguides 432b, 434b, 436b, 438b, 440b or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440b, 438b, 436b, 434b, 432b, each of which may be configured to distribute incoming light across each respective waveguide, for output toward the eye 410. Light exits an output surface of the image injection devices 420, 422, 424, 426, 428 and is injected into a corresponding input edge of the waveguides 440b, 438b, 436b, 434b, 432b. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 420, 422, 424, 426, 428 are discrete displays that each produce image information for injection into a corresponding waveguide 440b, 438b, 436b, 434b, 432b, respectively. In some other embodiments, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440b, 438b, 436b, 434b, 432b. In some embodiments, the controller 460 may be a single integral device, or a distributed system connected by wired or wireless communication channels. The controller 460 may be part of the processing modules 260 or 270 (illustrated in FIG. 2) in some embodiments.

The waveguides 440b, 438b, 436b, 434b, 432b may be configured to propagate light within each respective waveguide by total internal reflection (TIR). The waveguides 440b, 438b, 436b, 434b, 432b may each be planar or have another shape (e.g., curved), with major top and bottom surfaces and edges extending between those major top and bottom surfaces. In the illustrated configuration, the waveguides 440b, 438b, 436b, 434b, 432b may each include light extracting optical elements 440a, 438a, 436a, 434a, 432a that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440a, 438a, 436a, 434a, 432a) may, for example, be reflective or diffractive optical features. While illustrated disposed at the bottom major surfaces of the waveguides 440b, 438b, 436b, 434b, 432b for ease of description and drawing clarity, in some embodiments, the light extracting optical elements 440a, 438a, 436a, 434a, 432a may be disposed at the top or bottom major surfaces, or may be disposed directly in the volume of the waveguides 440b, 438b, 436b, 434b, 432b. In some embodiments, the light extracting optical elements 440a, 438a, 436a, 434a, 432a may be formed in a layer of material that is attached to a transparent substrate to form the waveguides 440b, 438b, 436b, 434b, 432b. In some other embodiments, the waveguides 440b, 438b, 436b, 434b, 432b may be a monolithic piece of material and the light extracting optical elements 440a, 438a, 436a, 434a, 432a may be formed on a surface or in the interior of that piece of material.

With continued reference to FIG. 4, as discussed herein, each waveguide 440b, 438b, 436b, 434b, 432b is configured to output light to form an image corresponding to a particular depth plane. For example, the waveguide 432b nearest the eye may be configured to deliver collimated light, as injected into such waveguide 432b, to the eye 410. The collimated light may be representative of the optical infinity focal plane. The next waveguide up 434b may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434b as coming from a first focal plane closer inward toward the eye 410 from optical infinity. Similarly, the third up waveguide 436b passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436b as coming from a second focal plane that is even closer inward toward the person from optical infinity than was light from the next waveguide up 434b.

The other waveguide layers (e.g., waveguides 438b, 440b) and lenses (e.g., lenses 456, 458) are similarly configured, with the highest waveguide 440b in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4, the light extracting optical elements 440a, 438a, 436a, 434a, 432a may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440a, 438a, 436a, 434a, 432a may be volumetric or surface features, which may be configured to output light at specific angles. For example, the light extracting optical elements 440a, 438a, 436a, 434a, 432a may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440a, 438a, 436a, 434a, 432a are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 (which may be an embodiment of the local processing and data module 260) can be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The FOV of the world camera may or may not be the same as the FOV of a viewer 210 which encompasses a portion of the world 470 the viewer 210 perceives at a given time. For example, in some situations, the FOV of the world camera may be larger than the viewer 210 of the viewer 210 of the wearable system 400. The entire region available for viewing or imaging by a viewer may be referred to as the field of regard (FOR). The FOR may include $4\pi$ steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can include an audio sensor 232, e.g., a microphone, to capture ambient sound. As described above, in some embodiments, one or more other audio sensors can be positioned to provide stereo sound reception useful to the determination of location of a speech source. The audio sensor 232 can comprise a directional microphone, as another example, which can also provide such useful directional information as to where the audio source is located. The wearable system 400 can use information from both the outward-facing imaging system 464 and the audio sensor 230 in locating a source of speech, or to determine an active speaker at a particular moment in time, etc. For example, the wearable system 400 can use the voice recognition alone or in combination with a reflected image of the speaker (e.g., as seen in a mirror) to determine the identity of the speaker. As another example, the wearable system 400 can determine a position of the speaker in an environment based on sound acquired from directional microphones. The wearable system 400 can parse the sound coming from the speaker's position with speech recognition algorithms to determine the content of the speech and use voice recognition techniques to determine the identity (e.g., name or other demographic information) of the speaker.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size and/or orientation of the pupil of the eye 304. The inward-facing imaging system 466 can be used to obtain images for use in determining the direction the user is looking (e.g., eye pose) or for biometric identification of the user (e.g., via iris identification). In some embodiments, at least one camera may be utilized for each eye, to separately determine the pupil size or eye pose of each eye independently, thereby allowing the presentation of image information to each eye to be dynamically tailored to that eye. In some other embodiments, the pupil diameter or orientation of only a single eye 410 (e.g., using only a single camera per pair of eyes) is determined and assumed to be similar for both eyes of the user. The images obtained by the inward-facing imaging system 466 may be analyzed to determine the user's eye pose or mood, which can be used by the wearable system 400 to decide which audio or visual content should be presented to the user. The wearable system 400 may also determine head pose (e.g., head position or head orientation) using sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Figure 5:
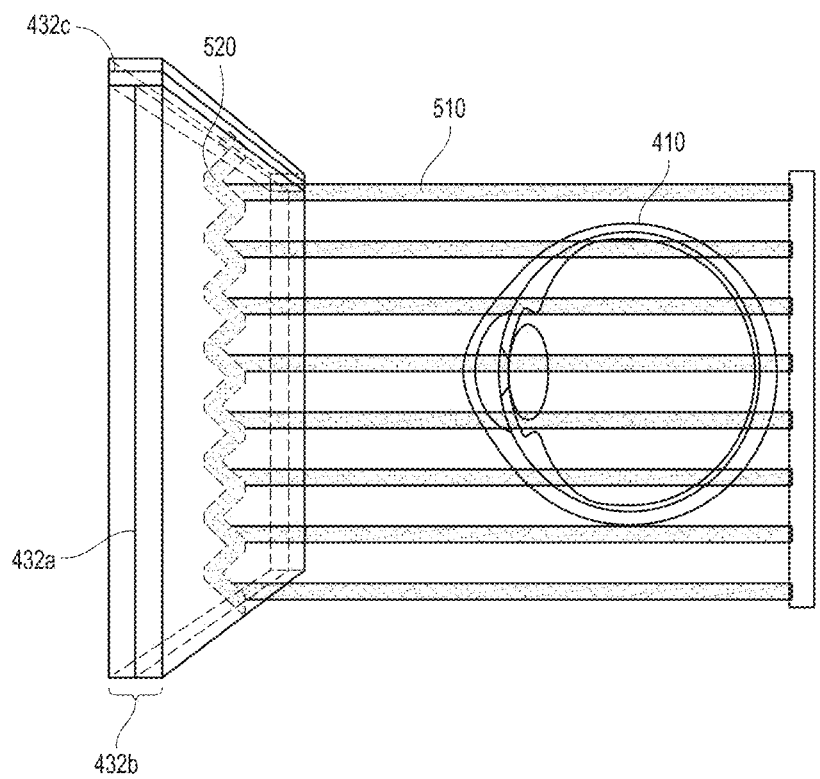
FIG. 5 shows example exit beams that may be outputted by a waveguide.

FIG. 5 shows an example of exit beams outputted by a waveguide. One waveguide is illustrated, but it will be appreciated that other waveguides in the waveguide assembly 480 may function similarly, where the waveguide assembly 480 includes multiple waveguides. Light 520 is injected into the waveguide 432*b* at the input edge 432*c* of the waveguide 432*b* and propagates within the waveguide 432*b* by TIR. At points where the light 520 impinges on the DOE 432*a*, a portion of the light exits the waveguide as exit beams 510. The exit beams 510 are illustrated as substantially parallel but they may also be redirected to propagate to the eye 410 at an angle (e.g., forming divergent exit beams), depending on the depth plane associated with the waveguide 432*b*. It will be appreciated that substantially parallel exit beams may be indicative of a waveguide with light extracting optical elements that outcouple light to form images that appear to be set on a depth plane at a large distance (e.g., optical infinity) from the eye 410. Other waveguides or other sets of light extracting optical elements may output an exit beam pattern that is more divergent, which would require the eye 410 to accommodate to a closer distance to bring it into focus on the retina and would be interpreted by the brain as light from a distance closer to the eye 410 than optical infinity.

Figure 6:
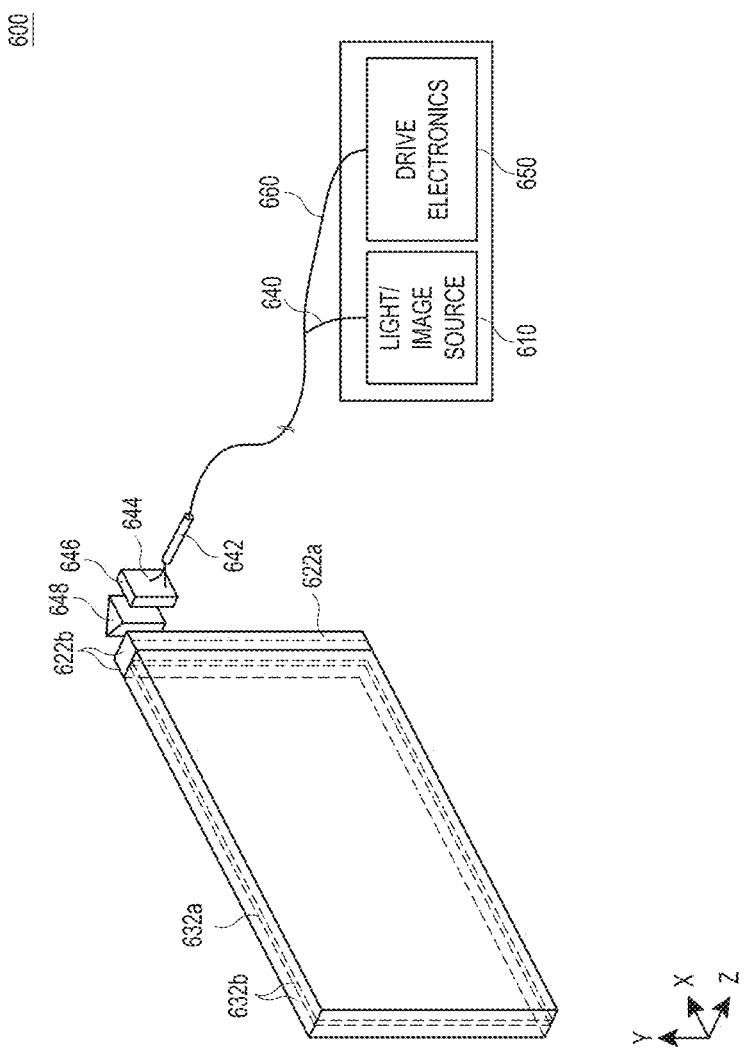
FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field.

FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field. The optical system can include a waveguide apparatus, an optical coupler subsystem to optically couple light to or from the waveguide apparatus, and a control subsystem. The optical system can be used to generate a multi-focal volumetric, image, or light field. The optical system can include one or more primary planar waveguides 632*a* (only one is shown in FIG. 6) and one or more DOEs 632*b* associated with each of at least some of the primary waveguides 632*a*. The planar waveguides 632*b* can be similar to the waveguides 432*b*, 434*b*, 436*b*, 438*b*, 440*b* discussed with reference to FIG. 4. The optical system may employ a distribution waveguide apparatus to relay light along a first axis (vertical or Y-axis in view of FIG. 6), and expand the light's effective exit pupil along the first axis (e.g., Y-axis). The distribution waveguide apparatus may, for example, include a distribution planar waveguide 622*b* and at least one DOE 622*a* (illustrated by double dash-dot line) associated with the distribution planar waveguide 622*b*. The distribution planar waveguide 622*b* may be similar or identical in at least some respects to the primary planar waveguide 632*b*, having a different orientation therefrom. Likewise, at least one DOE 622*a* may be similar to or identical in at least some respects to the DOE 632*a*. For example, the distribution planar waveguide 622*b* or DOE 622*a* may be comprised of the same materials as the primary planar waveguide 632*b* or DOE 632*a*, respectively. Embodiments of the optical display system 600 shown in FIG. 6 can be integrated into the wearable system 200 shown in FIG. 2.

The relayed and exit-pupil expanded light may be optically coupled from the distribution waveguide apparatus into the one or more primary planar waveguides 632*b*. The primary planar waveguide 632*b* can relay light along a second axis, preferably orthogonal to first axis (e.g., horizontal or X-axis in view of FIG. 6). Notably, the second axis can be a non-orthogonal axis to the first axis. The primary planar waveguide 632*b* expands the light's effective exit pupil along that second axis (e.g., X-axis). For example, the distribution planar waveguide 622*b* can relay and expand light along the vertical or Y-axis, and pass that light to the primary planar waveguide 632*b* which can relay and expand light along the horizontal or X-axis.

The optical system may include one or more sources of colored light (e.g., red, green, and blue laser light) 610 which may be optically coupled into a proximal end of a single mode optical fiber 640. A distal end of the optical fiber 640 may be threaded or received through a hollow tube 642 of piezoelectric material. The distal end protrudes from the tube 642 as fixed-free flexible cantilever 644. The piezoelectric tube 642 can be associated with four quadrant electrodes (not illustrated). The electrodes may, for example, be plated on the outside, outer surface or outer periphery or diameter of the tube 642. A core electrode (not illustrated) may also be located in a core, center, inner periphery or inner diameter of the tube 642.

Drive electronics 650, for example electrically coupled via wires 660, drive opposing pairs of electrodes to bend the piezoelectric tube 642 in two axes independently. The protruding distal tip of the optical fiber 644 has mechanical modes of resonance. The frequencies of resonance can depend upon a diameter, length, and material properties of the optical fiber 644. By vibrating the piezoelectric tube 642 near a first mode of mechanical resonance of the fiber cantilever 644, the fiber cantilever 644 can be caused to vibrate, and can sweep through large deflections.

By stimulating resonant vibration in two axes, the tip of the fiber cantilever 644 is scanned biaxially in an area filling two-dimensional (2D) scan. By modulating an intensity of light source(s) 610 in synchrony with the scan of the fiber cantilever 644, light emerging from the fiber cantilever 644 can form an image. Descriptions of such a set up are provided in U.S. Patent Publication No. 2014/0003762, which is incorporated by reference herein in its entirety.

A component of an optical coupler subsystem can collimate the light emerging from the scanning fiber cantilever 644. The collimated light can be reflected by mirrored surface 648 into the narrow distribution planar waveguide 622b which contains the at least one diffractive optical element (DOE) 622a. The collimated light can propagate vertically (relative to the view of FIG. 6) along the distribution planar waveguide 622b by TIR, and in doing so repeatedly intersects with the DOE 622a. The DOE 622a preferably has a low diffraction efficiency. This can cause a fraction (e.g., 10%) of the light to be diffracted toward an edge of the larger primary planar waveguide 632b at each point of intersection with the DOE 622a, and a fraction of the light to continue on its original trajectory down the length of the distribution planar waveguide 622b via TIR.

At each point of intersection with the DOE 622a, additional light can be diffracted toward the entrance of the primary waveguide 632b. By dividing the incoming light into multiple outcoupled sets, the exit pupil of the light can be expanded vertically by the DOE 622a in the distribution planar waveguide 622b. This vertically expanded light coupled out of distribution planar waveguide 622b can enter the edge of the primary planar waveguide 632b.

Light entering primary waveguide 632b can propagate horizontally (relative to the view of FIG. 6) along the primary waveguide 632b via TIR. As the light intersects with DOE 632a at multiple points as it propagates horizontally along at least a portion of the length of the primary waveguide 632b via TIR. The DOE 632a may advantageously be designed or configured to have a phase profile that is a summation of a linear diffraction pattern and a radially symmetric diffractive pattern, to produce both deflection and focusing of the light. The DOE 632a may advantageously have a low diffraction efficiency (e.g., 10%), so that only a portion of the light of the beam is deflected toward the eye of the view with each intersection of the DOE 632a while the rest of the light continues to propagate through the primary waveguide 632b via TIR.

At each point of intersection between the propagating light and the DOE 632a, a fraction of the light is diffracted toward the adjacent face of the primary waveguide 632b allowing the light to escape the TIR, and emerge from the face of the primary waveguide 632b. In some embodiments, the radially symmetric diffraction pattern of the DOE 632a additionally imparts a focus level to the diffracted light, both shaping the light wavefront (e.g., imparting a curvature) of the individual beam as well as steering the beam at an angle that matches the designed focus level.

Accordingly, these different pathways can cause the light to be coupled out of the primary planar waveguide 632b by a multiplicity of DOEs 632a at different angles, focus levels, or yielding different fill patterns at the exit pupil. Different fill patterns at the exit pupil can be beneficially used to create a light field display with multiple depth planes. Each layer in the waveguide assembly or a set of layers (e.g., 3 layers) in the stack may be employed to generate a respective color (e.g., red, blue, green). Thus, for example, a first set of three adjacent layers may be employed to respectively produce red, blue and green light at a first focal depth. A second set of three adjacent layers may be employed to respectively produce red, blue and green light at a second focal depth. Multiple sets may be employed to generate a full 3D or 4D color image light field with various focal depths.

Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

Example Wearable Systems, Environments, and Interfaces

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 7:
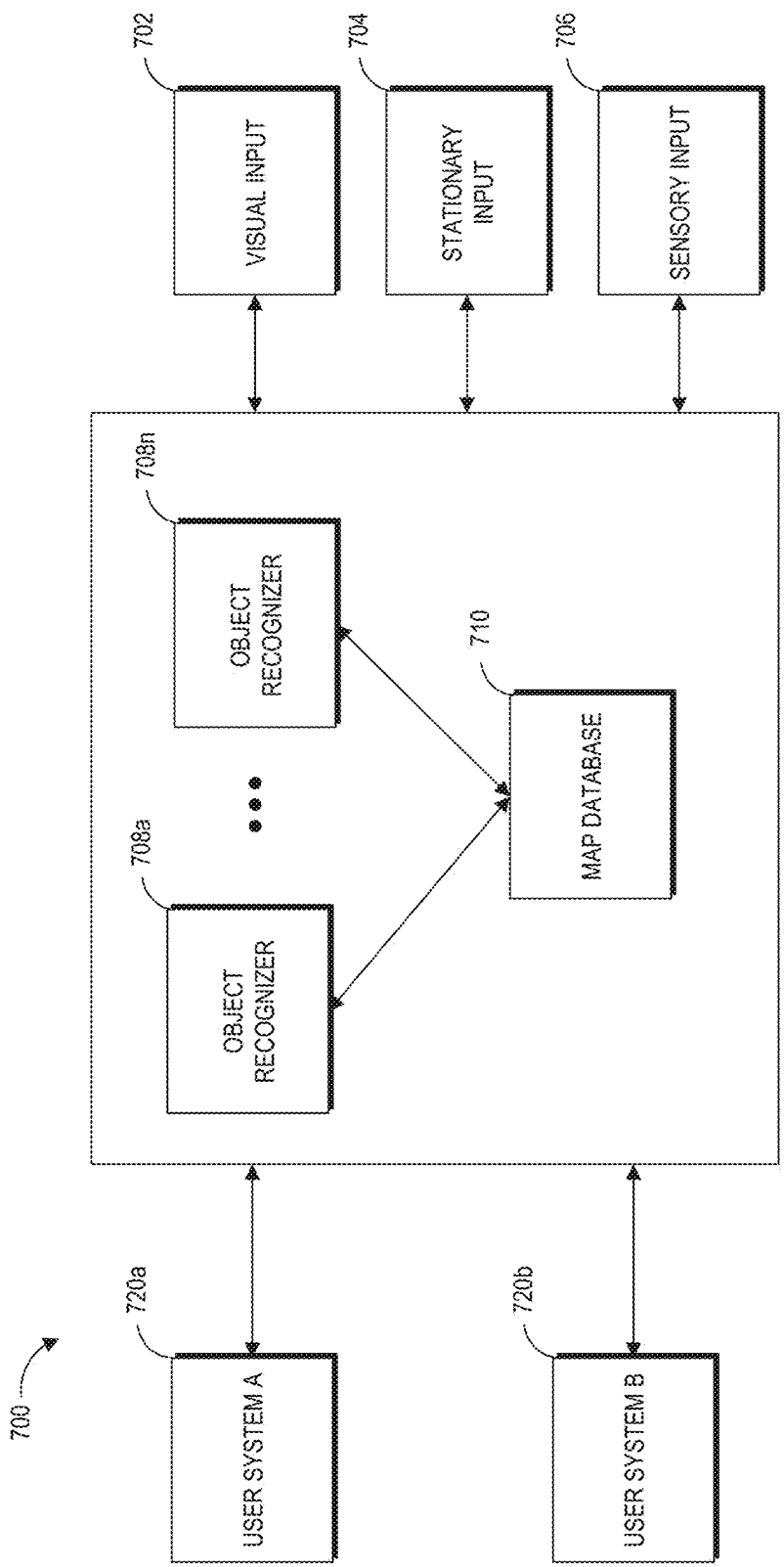
FIG. 7 is a block diagram of an example of a wearable system.

FIG. 7 is a block diagram of an example of an MR environment 700. The MR environment 700 may be configured to receive input (e.g., visual input 702 from the user's wearable system, stationary input 704 such as room cameras, sensory input 706 from various sensors, gestures, totems, eye tracking, user input from the user input device 466 etc.) from one or more user wearable systems (e.g., wearable system 200 or display system 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras and/or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708a to 708n may recognize objects in an environment. For example, the object recognizers can recognize faces, persons, windows, walls, user input devices, televisions, documents (e.g., travel tickets, driver's license, passport as described in the security examples herein), other objects in the user's environment, etc. One or more object recognizers may be specialized for object with certain characteristics. For example, the object recognizer 708a may be used to recognizer faces, while another object recognizer may be used recognize documents.

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition (e.g., persons or documents), object pose estimation, facial recognition (e.g., from a person in the environment or an image on a document), learning, indexing, motion estimation, or image analysis (e.g., identifying indicia within documents such as photos, signatures, identification information, travel information, etc.), and so forth. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the wearable HMD can be configured to utilize a plurality of techniques to generate models for analysis of the aggregated data. Other techniques may include using pre-defined thresholds or data values.

Based on this information and collection of points in the map database, the object recognizers 708a to 708n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. The semantic information can include affordances of the objects as described herein. For example, the semantic information may include a normal of the object. The system can assign a vector whose direction indicates the normal of the object. Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

Figure 8:
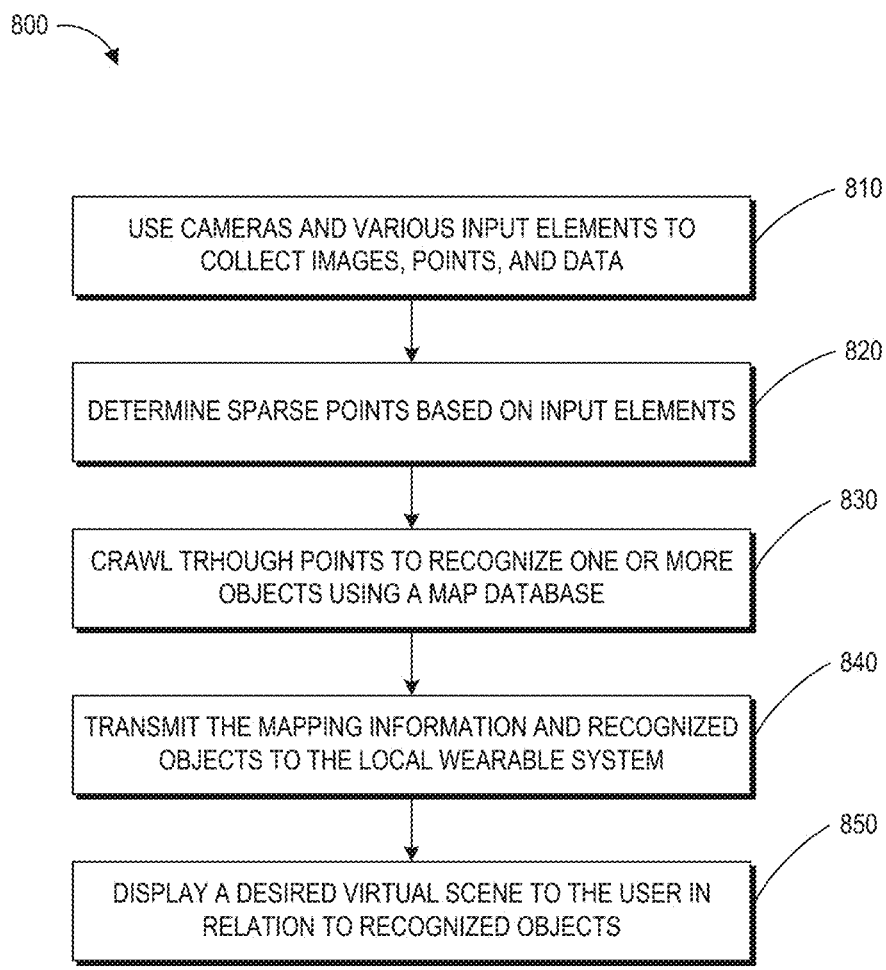
FIG. 8 is a process flow diagram of an example of a method of rendering virtual content in relation to recognized objects.

FIG. 8 is a process flow diagram of an example of a method 800 of rendering virtual content in relation to recognized objects. The method 800 describes how a virtual scene may be presented to a user of the wearable system. The user may be geographically remote from the scene. For example, the user may be in New York, but may want to view a scene that is presently going on in California, or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the user's surroundings. The object recognizers 708a-708n may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Figure 9:
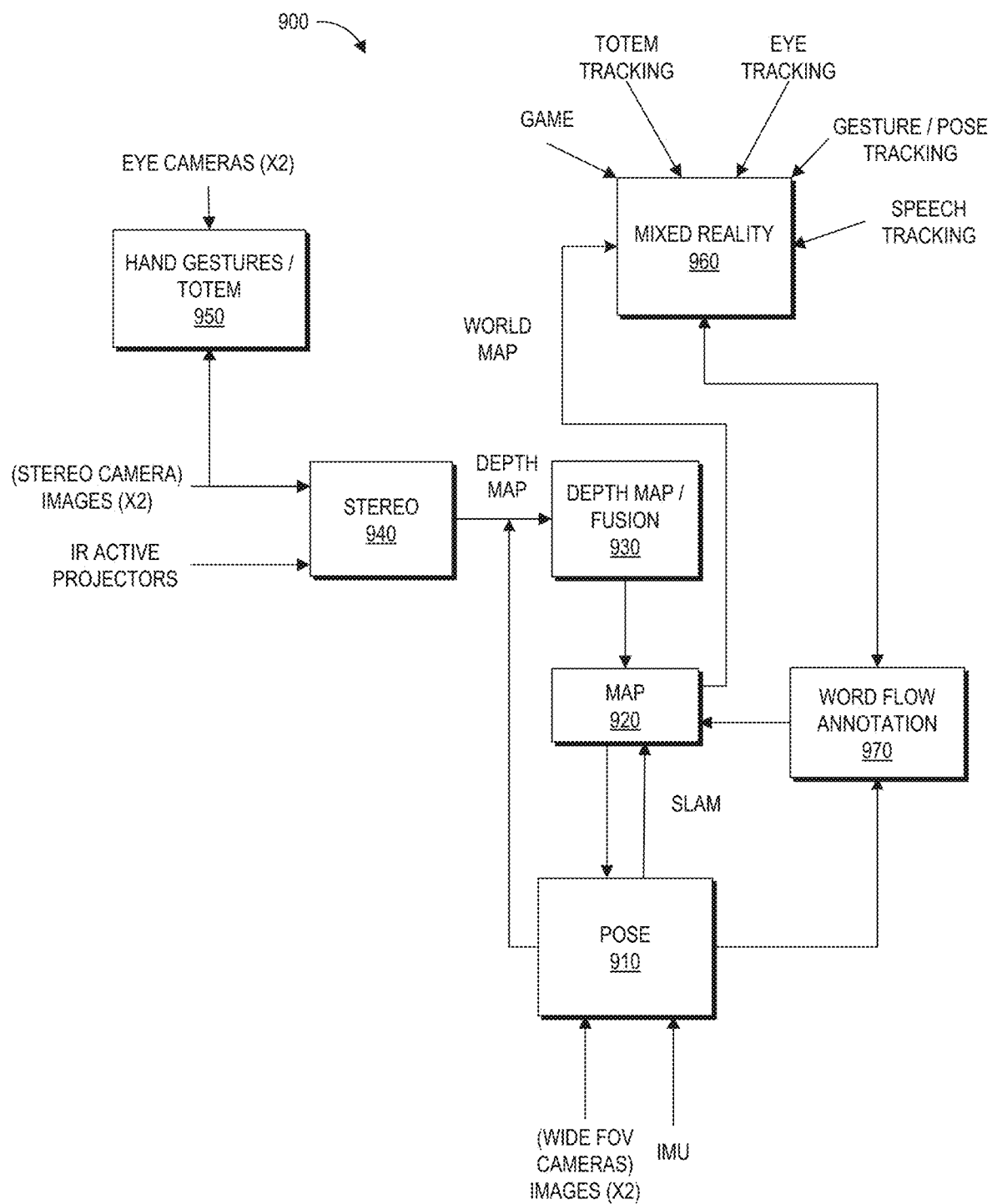
FIG. 9 is a block diagram of another example of a wearable system that includes an embodiment of a word flow annotation system.

FIG. 9 is a block diagram of another example of a wearable system. In this example, the wearable system 900 comprises a map 920, which may include the map database 710 containing map data for the world. The map may partly reside locally on the wearable system, and may partly reside at networked storage locations accessible by wired or wireless network (e.g., in a cloud system). A pose process 910 may be executed on the wearable computing architecture (e.g., processing module 260 or controller 460) and utilize data from the map 920 to determine position and orientation of the wearable computing hardware or user. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (e.g., SLAM or vSLAM, referring to a configuration wherein the input is images/visual only) process. The system can be configured to not only find out where in the world the various components are, but what the world is made of. Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 940, wherein depth information is determined using a technique such as triangulation or time-of-flight sensing. Image information and active patterns (such as infrared patterns created using active projectors), images acquired from image cameras, or hand gestures/totem 950 may serve as input to the Stereo process 940. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 940 may be combined in the fusion process 930. Pose 910 may be an input to this fusion process 930 as well, and the output of fusion 930 becomes an input to populating the map process 920. Sub-surfaces may connect with each other, such as in topographical mapping, to form larger surfaces, and the map becomes a large hybrid of points and surfaces.

To resolve various aspects in a mixed reality process 960, various inputs may be utilized. For example, in the embodiment depicted in FIG. 9, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding the location of the objects or semantic information of the objects and the world map can be another valuable input to mixed reality. Pose relative to the world becomes an input as well and plays a key role to almost any interactive system.

Controls or inputs from the user are another input to the wearable system 900. As described herein, user inputs can include visual input, gestures, totems, audio input, sensory input, etc. In order to move around or play a game, for example, the user may need to instruct the wearable system 900 regarding what he or she wants to do. Beyond just moving oneself in space, there are various forms of user controls that may be utilized. In one embodiment, a totem (e.g. a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 900 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 900 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined. Eye tracking can be performed by the eye camera(s) to determine eye gaze (e.g., direction or orientation of one or both eyes). Other techniques can be used for eye tracking such as, e.g., measurement of electrical potentials by electrodes placed near the eye(s) (e.g., electrooculography).

Speech tracking can be another input can be used alone or in combination with other inputs (e.g., totem tracking, eye tracking, gesture tracking, etc.). Speech tracking may include speech recognition, voice recognition, alone or in combination. The system 900 can include an audio sensor (e.g., a microphone) that receives an audio stream from the environment. The system 900 can incorporate voice recognition technology to determine who is speaking (e.g., whether the speech is from the wearer of the ARD or another person or voice (e.g., a recorded voice transmitted by a loudspeaker in the environment)) as well as speech recognition technology to determine what is being said. The local data & processing module 260 or the remote processing module 270 can process the audio data from the microphone (or audio data in another stream such as, e.g., a video stream being watched by the user) to identify content of the speech by applying various speech recognition algorithms, such as, e.g., hidden Markov models, dynamic time warping (DTW)-based speech recognitions, neural networks, deep learning algorithms such as deep feedforward and recurrent neural networks, end-to-end automatic speech recognitions, machine learning algorithms (described with reference to FIG. 7), or other algorithms that uses acoustic modeling or language modeling, etc. In some cases, the speech will come from multiple sources, for example, from another person in the vicinity of the user, from an announcer on a television playing in the vicinity of the person, and from speech content that is being played to the user of the ARD via the speaker 240. As further described below, these different speech sources (e.g., a person, a television announcer, and an audio stream in this example) may be content analyzed and different topics may be presented differently to the user by a user interface of the ARD (e.g., different topics organized into different threads, speech by different speakers organized into different threads, or a combination of these).

The local data & processing module 260 or the remote processing module 270 can also apply voice recognition algorithms which can identify the identity of the speaker, such as whether the speaker is the user 210 of the wearable system 900 or another person with whom the user is conversing. Some example voice recognition algorithms can include frequency estimation, hidden Markov models, Gaussian mixture models, pattern matching algorithms, neural networks, matrix representation, Vector Quantization, speaker diarisation, decision trees, and dynamic time warping (DTW) technique. Voice recognition techniques can also include anti-speaker techniques, such as cohort models, and world models. Spectral features may be used in representing speaker characteristics. The local data & processing module or the remote data processing module 270 can use various machine learning algorithms described with reference to FIG. 7 to perform the voice recognition.

An implementation of a word flow annotation system 970 can use these user controls or inputs via a user interface (UI). UI elements (e.g., controls, popup windows, bubbles, data entry fields, etc.) can be used, for example, to dismiss a display of auxiliary information, or to add a word to a common word dictionary. Examples of such implementations and these uses are described further below.

With regard to the camera systems, the example wearable system 900 shown in FIG. 9 can include three pairs of cameras: a relative wide FOV or passive SLAM pair of cameras arranged to the sides of the user's face, a different pair of cameras oriented in front of the user to handle the stereo imaging process 940 and also to capture hand gestures and totem/object tracking in front of the user's face. The FOV cameras and the pair of cameras for the stereo process 940 may be a part of the outward-facing imaging system 464 (shown in FIG. 4). The wearable system 900 can include eye tracking cameras (which may be a part of an inward-facing imaging system 462 shown in FIG. 4) oriented toward the eyes of the user in order to triangulate eye vectors and other information. The wearable system 900 may also comprise one or more textured light projectors (such as infrared (IR) projectors) to inject texture into a scene.

Figure 10:
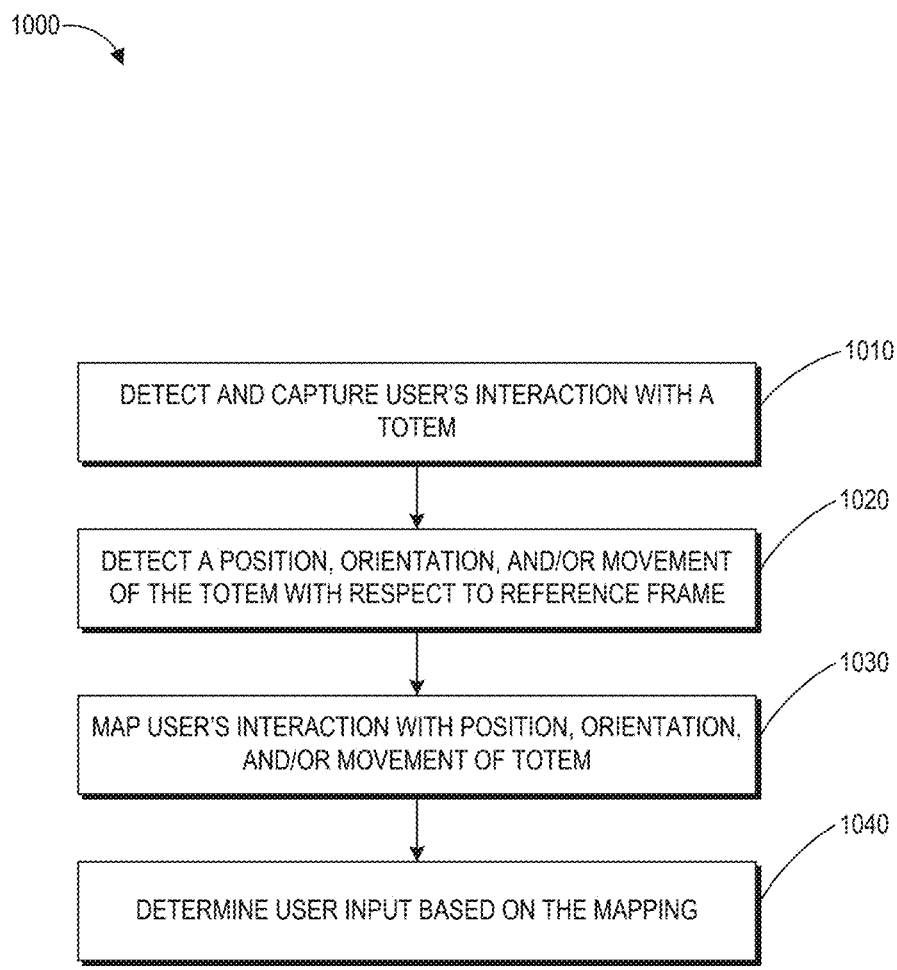
FIG. 10 is a process flow diagram of an example of a method for determining user input to a wearable system.

FIG. 10 is a process flow diagram of an example of a method 1000 for determining user input to a wearable system. In this example, the user may interact with a totem. The user may have multiple totems. For example, the user may have designated one totem for a social media application, another totem for playing games, etc. At block 1010, the wearable system may detect a motion of a totem. The movement of the totem may be recognized through the outward-facing imaging system or may be detected through sensors (e.g., haptic glove, image sensors, hand tracking devices, eye-tracking cameras, head pose sensors, etc.).

Based at least partly on the detected gesture, eye pose, head pose, or input through the totem, the wearable system detects a position, orientation, or movement of the totem (or the user's eyes or head or gestures) with respect to a reference frame, at block 1020. The reference frame may be a set of map points based on which the wearable system translates the movement of the totem (or the user) to an action or command. At block 1030, the user's interaction with the totem is mapped. Based on the mapping of the user interaction with respect to the reference frame 1020, the system determines the user input at block 1040.

For example, the user may move a totem or physical object back and forth to signify turning a virtual page and moving on to a next page or moving from one user interface (UI) display screen to another UI screen. As another example, the user may move their head or eyes to look at different real or virtual objects in the user's FOR. If the user's gaze at a particular real or virtual object is longer than a threshold time, the real or virtual object may be selected as the user input. In some implementations, the vergence of the user's eyes can be tracked and an accommodation/vergence model can be used to determine the accommodation state of the user's eyes, which provides information on a depth plane on which the user is focusing. In some implementations, the wearable system can use ray casting techniques to determine which real or virtual objects are along the direction of the user's head pose or eye pose. In various implementations, the ray casting techniques can include casting thin, pencil rays with substantially little transverse width or casting rays with substantial transverse width (e.g., cones or frustums).

The user interface may be projected by the display system as described herein (such as the display 220 in FIG. 2). It may also be displayed using a variety of other techniques such as one or more projectors. The projectors may project images onto a physical object such as a canvas or a globe. Interactions with user interface may be tracked using one or more cameras external to the system or part of the system (such as, e.g., using the inward-facing imaging system 462 or the outward-facing imaging system 464).

Figure 11:
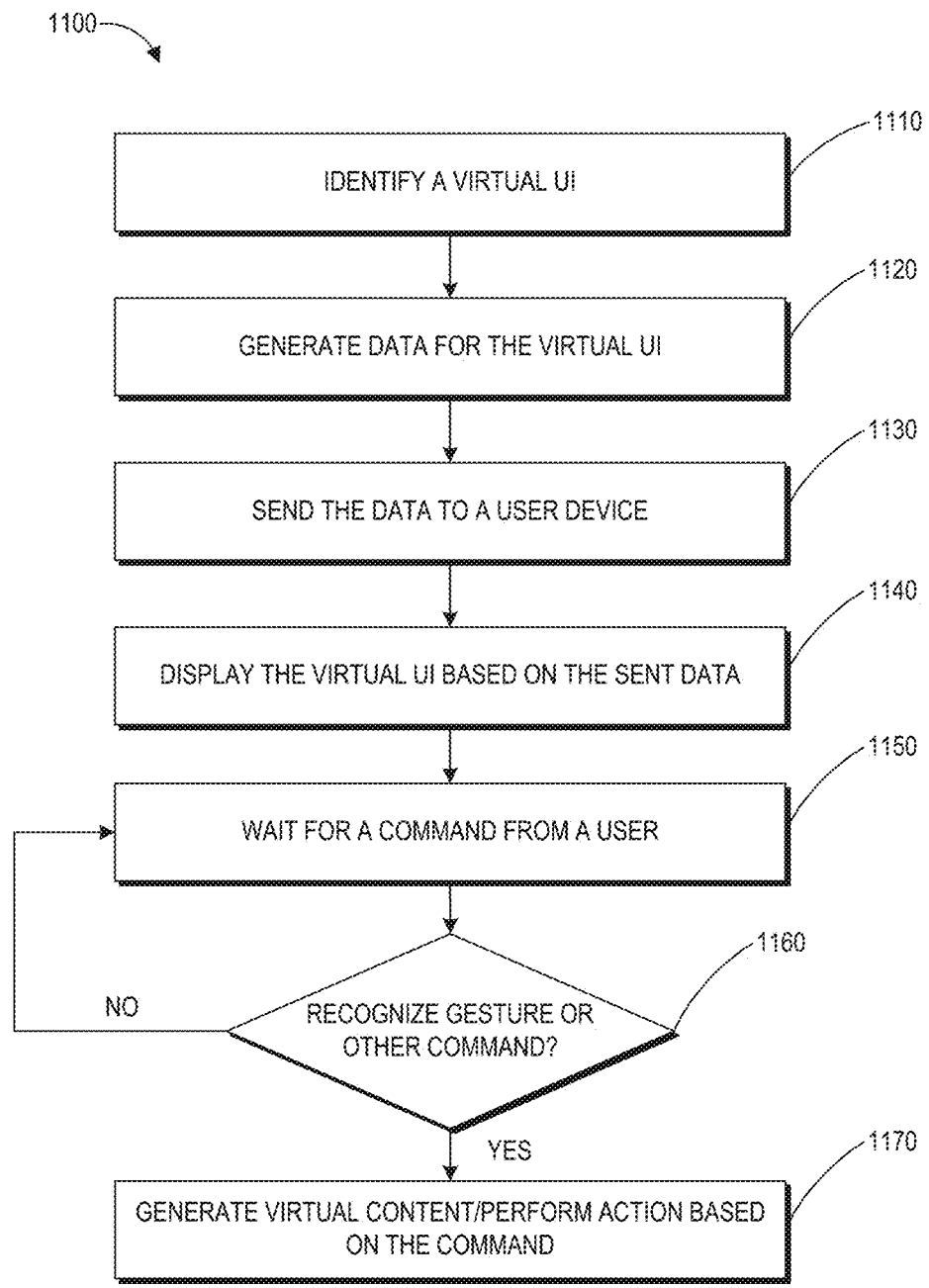
FIG. 11 is a process flow diagram of an example of a method for interacting with a virtual user interface.

FIG. 11 is a process flow diagram of an example of a method 1100 for interacting with a virtual user interface. The method 1100 may be performed by the wearable system described herein. Embodiments of the method 1100 can be used by the wearable system to detect persons or documents in the FOV of the wearable system.

At block 1110, the wearable system may identify a particular UI. The type of UI may be predetermined by the user. The wearable system may identify that a particular UI needs to be populated based on a user input (e.g., gesture, visual data, audio data, sensory data, direct command, etc.). The UI can be specific to a security scenario where the wearer of the system is observing users who present documents to the wearer (e.g., at a travel checkpoint). At block 1120, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. In the security context described herein, the UI may be displayed as if the UI were surrounding the traveler who is presenting documents to the wearer of the system, so that the wearer can readily view the UI while looking at the traveler and the traveler's documents. If the UI is hand centric, the map coordinates of the user's hands may be determined. These map points may be derived through data received through the FOV cameras, sensory input, or any other type of collected data.

At block 1130, the wearable system may send the data to the display from the cloud or the data may be sent from a local database to the display components. At block 1140, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 1150. For example, the UI may be a body centric ring around the user's body or the body of a person in the user's environment (e.g., a traveler). The wearable system may then wait for the command (a gesture, a head or eye movement, voice command, input from a user input device, etc.), and if it is recognized (block 1160), virtual content associated with the command may be displayed to the user (block 1170).

Additional examples of wearable systems, UIs, and user experiences (UX) are described in U.S. Patent Publication No. 2015/0016777, which is incorporated by reference herein in its entirety.

Example Communications Among Multiple Wearable Systems

Figure 12:
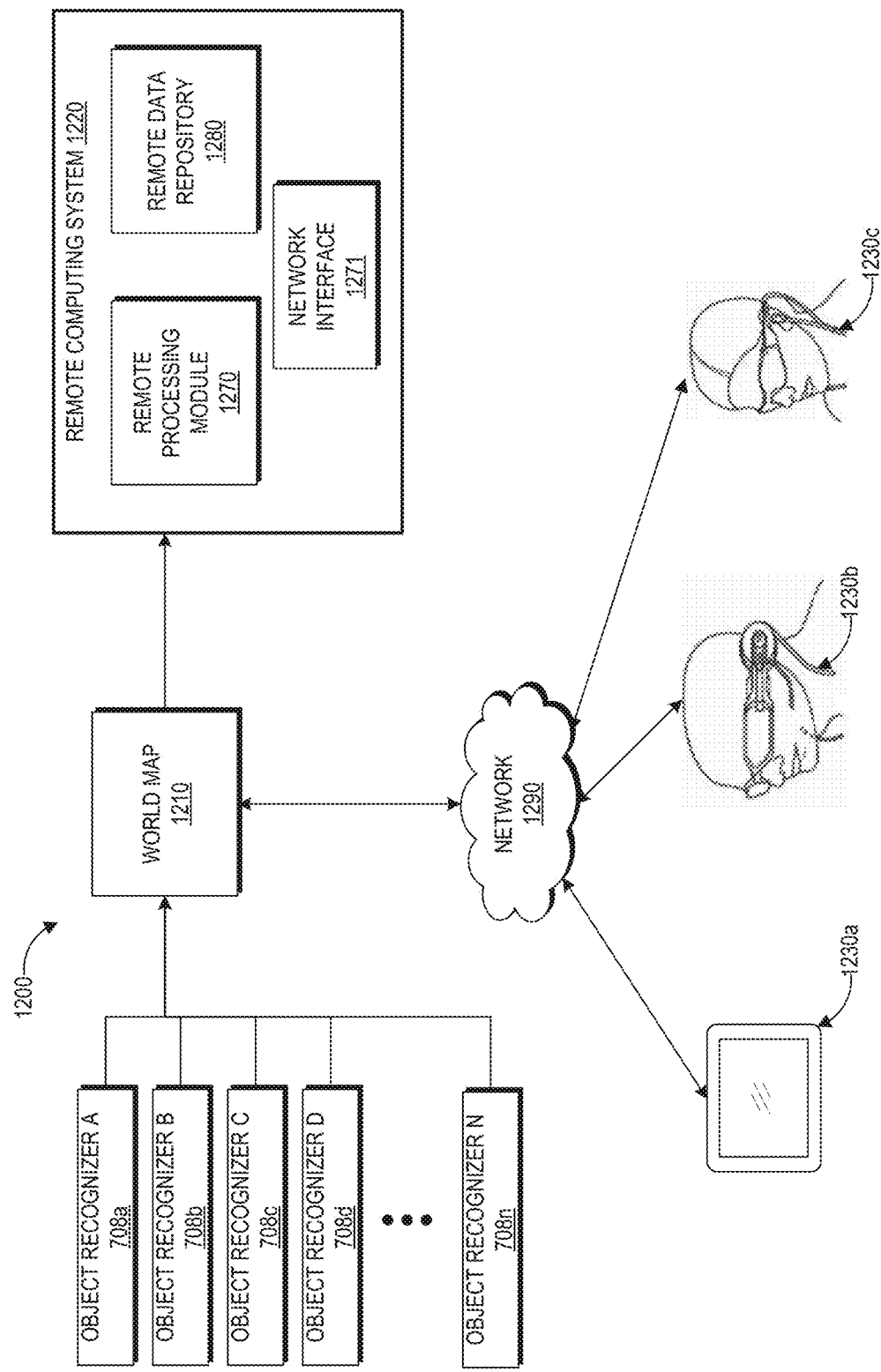
FIG. 12 schematically illustrates an overall system view depicting multiple user devices interacting with each other.

FIG. 12 schematically illustrates an overall system view depicting multiple user devices interacting with each other. The computing environment 1200 includes user devices 1230*a*, 1230*b*, 1230*c*. The user devices 1230*a*, 1230*b*, and 1230*c* can communicate with each other through a network 1290. The user devices 1230*a*-1230*c* can each include a network interface to communicate via the network 1290 with a remote computing system 1220 (which may also include a network interface 1271). The network 1290 may be a LAN, WAN, peer-to-peer network, radio, Bluetooth, or any other network. The computing environment 1200 can also include one or more remote computing systems 1220. The remote computing system 1220 may include server computer systems that are clustered and located at different geographic locations. The user devices 1230*a*, 1230*b*, and 1230*c* may communicate with the remote computing system 1220 via the network 1290.

The remote computing system 1220 may include a remote data repository 1280 which can maintain information about a specific user's physical and/or virtual worlds. Data storage 1280 can contain information useful to word flow annotation such as a common word dictionary, auxiliary information source, etc. The remote data repository may be an embodiment of the remote data repository 280 shown in FIG. 2. The remote computing system 1220 may also include a remote processing module 1270. The remote processing module 1270 may be an embodiment of the remote processing module 270 shown in FIG. 2. The remote processing module 1270 may include one or more processors which can communicate with the user devices (1230*a*, 1230*b*, 1230*c*) and the remote data repository 1280. The processors can process information obtained from user devices and other sources. In some implementations, at least a portion of the processing or storage can be provided by the local processing and data module 260 (as shown in FIG. 2). The remote computing system 1220 may enable a given user to share information about the specific user's own physical and/or virtual worlds with another user.

The user device may be a wearable device (such as an HMD or an ARD), a computer, a mobile device, or any other devices alone or in combination. For example, the user devices 1230*b* and 1230*c* may be an embodiment of the wearable system 200 shown in FIG. 2 (or the wearable system 400 shown in FIG. 4) which can be configured to present AR/VR/MR content.

One or more of the user devices can be used with the user input device 466 shown in FIG. 4. A user device can obtain information about the user and the user's environment (e.g., using the outward-facing imaging system 464 shown in FIG. 4). The user device and/or remote computing system 1220 can construct, update, and build a collection of images, points and other information using the information obtained from the user devices. For example, the user device may process raw information acquired and send the processed information to the remote computing system 1220 for further processing. The user device may also send the raw information to the remote computing system 1220 for processing. The user device may receive the processed information from the remote computing system 1220 and provide final processing before projecting to the user. The user device may also process the information obtained and pass the processed information to other user devices. The user device may communicate with the remote data repository 1280 while processing acquired information. Multiple user devices and/or multiple server computer systems may participate in the construction and/or processing of acquired images.

The information on the physical worlds may be developed over time and may be based on the information collected by different user devices. Models of virtual worlds may also be developed over time and be based on the inputs of different users. Such information and models can sometimes be referred to herein as a world map or a world model. As described with reference to FIGS. 7 and 9, information acquired by the user devices may be used to construct a world map 1210. The world map 1210 may include at least a portion of the map 920 described in FIG. 9. Various object recognizers (e.g. 708a, 708b, 708c . . . 708n) may be used to recognize objects and tag images, as well as to attach semantic information to the objects. These object recognizers are also described in FIG. 7.

The remote data repository 1280 can be used to store data and to facilitate the construction of the world map 1210. The user device can constantly update information about the user's environment and receive information about the world map 1210. The world map 1210 may be created by the user or by someone else. As discussed herein, user devices (e.g. 1230a, 1230b, 1230c) and remote computing system 1220, alone or in combination, may construct and/or update the world map 1210. For example, a user device may be in communication with the remote processing module 1270 and the remote data repository 1280. The user device may acquire and/or process information about the user and the user's environment. The remote processing module 1270 may be in communication with the remote data repository 1280 and user devices (e.g. 1230a, 1230b, 1230c) to process information about the user and the user's environment. The remote computing system 1220 can modify the information acquired by the user devices (e.g. 1230a, 1230b, 1230c), such as, e.g. selectively cropping a user's image, modifying the user's background, adding virtual objects to the user's environment, annotating a user's speech with auxiliary information, etc. The remote computing system 1220 can send the processed information to the same and/or different user devices.

Various functionalities of embodiments of the word flow annotation system will now be described.

Example Speech Capturing

An example implementation of the disclosed word flow annotation system occurs in a context of in-person communications. In such a context, the source of the detected speech is in the physical vicinity of a word flow annotation system. The audio sensor of the system can detect ambient audio information. A computing module (e.g., the word flow annotation system 970) can detect speech from the ambient audio information. This module can implement an algorithm of automatic speech recognition (as described with reference to FIG. 9), including schemes described herein. The computing module can parse a user's speech (e.g., by converting the speech to text) and identify a keyword in the user's speech. The keyword can include a rare word or a contextual keyword. The keyword may be identified by accessing a keyword database or by determining contextual information, alone or in combination. The contextual information may include information associated with the user or other participants in the conversation (e.g., demographic information, past activities/experiences, speech behaviors, etc.) or information associated with the environment (e.g., location of the conversation, objects or people in the environment, etc.). The keyword may be used for determining virtual content for presentation to a user of the wearable system 200. For example, the wearable system can present auxiliary information (such as, e.g., explanatory texts or images) associated with the keyword.

Another example implementation of the disclosed word flow annotation system occurs in a context of remote communications. In such an example scenario, a speaker is physically remote from a word flow annotation system (and its user). Audio information associated with the speaker may arrive at the listener through one of many channels. For example, the speaker and the listener may be conversing via a telephone or through an Internet audio or audio-video chat session. The speaker and the listener may be conversing using AR systems communicating through a network (such as, e.g., in a telepresence session), as illustrated in FIG. 12. As another example, the speaker may be a person in an audio or A/V program, such as one presented on radio, television, or Internet programming, etc. Where the speaker's voice can be heard in ambient sound at the listener's location, a word flow annotation system can capture sound in the same way as it does in the in-person communication context. Where the speaker's voice cannot be heard in ambient sound at the listener's location (for example, the listener hears the speaker through an audio amplifier 232 of the word flow annotation system 970), the system can capture sound in a different way, or skip the step of capturing sound (for example, the system can detect speech directly from electrical signals in which information associated with speech is embedded). More descriptions of remote communication usage are below in the subsection titled Telepresence.

Speaker Voice Rejection and Source Localization

An AR system can perform additional useful applications through a capability of associating a sound with its source or the location of its source. Several such applications are described below.

An example implementation determines whether the detected speech is the user's own speech. This can be achieved through the use of a plurality of audio sensor, e.g., two or more microphones, or through the use of a directional audio sensor, e.g., a directional microphone. With such audio sensor, the system can identify the location of a source of sound. Thus the system can distinguish the user's own speech from those of others. The system can be configured to not process the user's own speech for rare word detection.

An implementation of an AR system can identify the location of a source of sound as well as the position of the source relative to the user's FOR with information supplied, for example, through the cameras 464 and 466 or a stationary camera (e.g., the stationary input 704). The system can be configured to not process the speech from a person outside of the user's FOV for rare word detection.

The capability of an implementation to associate speech with its source can also be useful in providing context-dependent auxiliary information. Certain speakers are more likely to utter words in a particular area or context. For example, when a camera store employee says "SD" he is more likely speaking of a secured digital memory card than of the city of San Diego. Thus, an implementation that is capable of identifying a speaker as a camera store employee can more likely provide contextually correct auxiliary information to a user. The capability of identifying a speaker may be implemented in a number of ways. For example, names of participants in a speech (e.g., a dialogue or a monologue) are often stated in an introduction at the beginning of the speech. Or a user may input the name of the speaker to the system through an UI interaction. The system equipped with an outward-facing camera can capture an image of a speaker and identify the speaker through image recognition. The system can also perform voice recognition to identify the speaker's identity using various voice recognition algorithms described in FIG. 9.

Example Conversion from Speech to Text

To identify a keyword, the wearable system 200 can convert (e.g., by the word flow annotation system 970) an audio stream into text. Conversion of speech to text can be performed using algorithms such as deep learning (which may utilize deep neural networks) or other speech recognition algorithms described with reference to FIG. 9. The wearable system 200 can include speech to text functionality (e.g., in the local processing module 260) or can access speech-to-text functionality remotely (e.g., via the remote processing module 270). The wearable system 200 may utilize wireless connections to commercial speech-to-text services (e.g., via an application programming interface (API)). The word flow annotation technology may utilize any such speech-to-text algorithm, but in an unconventional way, namely, applying speech-to-text conversion to audio that does not originate from the user.

A word flow annotation implementation may perform conversion of speech to text locally or remotely, e.g., on a wearable device using the location processing & data module 260 or on a remote server (which for example includes the remote computing system 1220). Whether the conversion is performed locally or remotely, other processing steps such as keyword detection and auxiliary information retrieval may be done locally or remotely independent of where conversion is done. For example, if speech-to-text conversion is done remotely and keyword detection is done locally, a captured audio stream can be sent to a remote processing module 270 or a remote server via a network where the conversion is done; converted text strings are returned to a local component of the system (e.g., local processing and data module 260). As another example, if speech-to-text conversion, keyword detection, and auxiliary information retrieval are done remotely, a captured audio stream can be sent to a remote processing module 270 or to a remote server via a network and retrieved auxiliary information can be returned to a local component of the system. Other combinations of local/remote processing are viable.

Although in the examples described herein the AR system 200 can detect a keyword using speech to text conversion, in some implementations, the AR system 200 can detect the keyword using audio data directly. For example, the AR system 200 can look up the keyword based on a person/user's pronunciation of the keyword, without needing to convert the speech to text.

Example Detection of a Rare Word

The AR system can search converted text for keywords such as words that are rare. Example rare words can include words that are infrequent or uncommon for the user of the AR system. Rare words can include, but are not limited to, uncommonly used words, words from another language (e.g., the Chinese word guanxi used in an English sentence), technical words, words from specialized areas that are outside of the context the user of the AR system normally works in, and so forth. For example, the AR system may identify a word as being rare if the word is used infrequently in speech detected by the AR system. By providing a definition, translation, or contextual information for such rare words, the AR system advantageously can assist the user in better understanding speech that the user hears.

Rare words may be detected by comparison with a known list of common words. For example, a word can be considered rare if it is not found in a common word dictionary or database. A common word dictionary or database may be stored locally (e.g., in the data module 71 in FIG. 2) or stored remotely (e.g., in the remote data repository 74). A common word dictionary or database may be available from third party sources, e.g., available on the Internet.

A rare word may be detected through its frequency of utterance in the language or the associated rank in a word frequency list. Zipf's law is an example relating frequency of utterance with the rank in a word frequency list, namely, that a word's frequency of utterance is inversely proportional to its rank in the word frequency list. A rare word may be identified by the AR system based on its occurrence less than a threshold frequency in speech. The word flow system can allow a user to configure the system to detect words based on the user's knowledge of the language. For example, a user may configure the system to detect words not in a list of 5,000 or 7,000 (or another value) most common words. As another example, a user may configure the system to detect words whose likelihood of occurrence is less than a threshold such as 0.01%, 0.003%, 0.001%, or another value in the language. The AR system may come with a default threshold (e.g., 0.005%), which is user-configurable. Typically, the higher the threshold, more rare words will be flagged, and the lower the threshold, fewer rare words will be flagged. The user can set the threshold to a value where the auxiliary information presented for the rare words is deemed to be helpful to the user and not overly distracting. The AR system may permit the user to temporarily set the threshold to zero (e.g., to stop flagging rare words), which may be useful in certain situations such as the user driving a vehicle in an unfamiliar environment, the user attending a religious or cultural event where the user does not want to be distracted, or the user attending an event where a large fraction of the words may be rare words to the user (e.g., a lay user at a medical presentation where speakers routinely say specialized medical words and phrases).

In some implementations, a rare word is determined by infrequent usage of a word by comparison of usage statistics with a usage threshold, and if the word occurs less frequently than the usage threshold of words commonly used, then the word can be flagged as a rare word. Rare words and/or commonly used words can be stored by the system, and lists of rare and/or common words can be updated based on usage.

A rare word can be a word used infrequently in a user's known language. For example, the word "ossify" can be a rare word to many English speakers. A rare word can be a word in a language different from languages known to a user. For example, the Chinese phrase "guanxi" shown in FIG. 13A can be a rare word to many English speakers. A rare word can be a term in a specialized field, for example, a name of a drug, a term used in an uncommon sport such as croquet, etc. A rare word can be an acronym, a name of a business or nonprofit entity, a stock symbol. A rare word need not be a single word, but can be a group of words (e.g., "free electron laser"), a phrase (e.g., "bring your own device" or its acronym form "BYOD"), etc. Indeed, a word flow annotation system can be configured to allow a user to choose certain categories of words (such as some of the examples above) as candidates for annotation.

In addition or in alternative to rare words, the keywords can also be contextual keywords. The contextual keywords may include the words that are related to a topic of a conversation or words that are frequently used in a conversation. As an example, a user of the AR system 200 may be talking about a trip to Africa with his friend. Although the word "Africa" may not be a rare word in the English language, the AR system 200 can flag it as a contextual keyword because the conversation is related to Africa. As another example, while the user is talking about his or her trip to Africa, the user mentions his or her surfing experience in Africa. Accordingly, the user may repeatedly use the word "surf" in his or her speech. The AR system 200 can flag the word "surf" as a contextual keyword, because it is frequently used in a sentence.

Some words may be both a contextual keyword and a rare word. For example, when a person is giving a lecture on legal principles, the phrase "res judicata" may appear multiple times. Although the phrase "res judicata" may be considered as a rare word because it is a Latin phrase and is not commonly used in everyday speech, this phrase can also be considered as a contextual keyword due to its frequent occurrences in a legal professional's speech.

The AR system can also determine the relationship among words and phrases and detect a keyword based on the relationship. For example, a user's friend may say "I surfed in Africa". The AR system can determine that both the word "surf" and the word "Africa" are likely keywords. But because the user has been talking about his or her trip to Africa, the AR system may identify the word "Africa" as the keyword rather than the word "surf". However, if the user does not know much about surfing, the AR system may identify the word "surf" as a keyword rather than the word "Africa".

A keyword may be pre-designated. The AR system can include a database of contextual keywords that are designated by a user or another party (e.g., an application developer, a shopping website, etc.). The database of keywords may be editable by the user, e.g., to add or remove keywords (or rare words). As an example, a user of the AR system 200 may recently have had a baby named Linda. The user can set the phrase "my daughter Linda" as a contextual keyword. Therefore, when the AR system detects that the user says "my daughter Linda", the AR system can automatically present auxiliary information on the user's baby, such as, e.g., whether the baby is sleeping or hungry. As another example, the AR system may tag the phase "utility bill" as the keyword. Accordingly, the AR system can automatically present the user's utility bill including due date and amount upon detection of the phrase "utility bill" in a speech.

The keywords can be determined based on contextual information associated a user, an environment, or a participant in a conversation. An example word flow annotation system can utilize, at least in part, user behavior in the detection of a keyword. For instance, a user may temporarily stare in a certain direction upon hearing a word the user does not understand. Such an example system can detect this particular stare, using an inward-facing camera 466 for example, in search for a likely rare word in speech occurring prior to the stare. As another example, a user may repeat, in isolation, a word spoken by another person to prompt the system to process the word as a keyword. The system can use other user behavior to aid its detection of keywords. Indeed, an implementation can allow a user to customize behaviors incorporated by the implementation in the keyword detection. For example, the AR system can provide a user interface by which the user can add or remove words to a list of common words or rare words. The AR system can monitor a user's own speech for rare word classification. For example, the speech of a cryptographer may contain the acronym AES (Advanced Encryption Standard). Upon detecting the acronym AES of the cryptographer/user multiple times (e.g., 3 or 5 times) or multiple times in a configurable duration of time (e.g., three times in five minutes, seven times in an hour, etc.), the AR system can re-classify the acronym AES as a common word for this user. The AR system can monitor frequencies of words that it detects and update the lists of common or rare words. For example, the word "simvastatin" (for a cholesterol drug) may be a rare word for many users but not for users who are healthcare professionals. For a user who is a health care professional, the AR system may detect that this word is not used infrequently in speech detected by the healthcare professional's AR system, and re-classify this word as a common word for this user. Re-classification may be achieved, for example, by adding a word to a common word dictionary for the user. The common word dictionary for the user may be stored in the local data module 260 or the remote data repository 280 in system 200 illustrated in FIG. 2.

Although this example is described with reference to classifying whether a word is a rare word or a common word, in some embodiments, the classification/reclassification is for the keyword in general. When the AR system detects that a word is used multiple times or when a rare word appears in a conversation, the AR system may flag the word as a keyword. For example, when the AR system can detect the word "petrify" is used multiple times in a user's conversation, the AR system can classify the word "petrify" as a keyword. However, the AR system may later determine that user is involved in a conversation related to fossils. The AR system may reclassify the word "petrify" such that it is no longer a keyword because the AR system can determine that the user has learned (or otherwise knows) the meaning of the word "petrify".

In some implementations, a rare word may be associated with a decay factor such that the presentation of the auxiliary information associated with the rare word tends to decay or even cease (based at least in part on the decay factor) under the assumption that the user is learning the meaning of the rare word if the auxiliary information has been presented frequently to the user. The decay factor may include a time period such that if the rare word is mentioned more than a threshold number of times during the time period, the display of auxiliary information decays or ceases. The decay factor may include a numerical count such that if the number of times the rare word is mentioned exceeds the numerical count, the display of auxiliary information decays or ceases. The decay factor, time period, or numerical count (or associated thresholds) may be user configurable.

In addition to or as an alternative to keywords, the AR system can also detect objects of interest (such as, e.g., an object or a person) in a user's environment. The AR system can detect the object of interest using one or more object recognizers 708 described in FIG. 7. As an example, a user of the AR system 200 lives in Florida. The user may go on a vacation in California. The user may see, e.g., through the AR display 220, a sea lion lying on a beach in California. The AR system 200 can detect the sea lion using the outward-facing imaging system 464 and identify the sea lion using an object recognizer 708. The AR system 200 can flag the sea lion as an object of interest because the user typically does not encounter or see sea lions in Florida.

Example Retrieval of Auxiliary Information

A word flow annotation system can retrieve auxiliary information associated with an object of interest that the system detects. Auxiliary information may include text, image, or other audio or visual information. The system can present auxiliary information visually (e.g., via the display 220), in an audio (e.g., via an audio amplifier 232 or speaker 240), via tactile (e.g., haptic) feedback, etc.

The word flow annotation system may comprise a data repository (e.g., a database) of information including objects of interest and their associated auxiliary information. For example, the data repository may store common words, rare words, other contextual keywords, common objects in a user's environment (with which the user often interacts), etc. The auxiliary information can include semantic information (as described with reference to FIG. 7), a meaning or an explanation, purchase information associated with the object, status or statistics, additional details of the object of interest which the user may not apparently perceive, or other information which facilitates understandings of and interactions with an object of interest. Examples of auxiliary information are further described in FIGS. 13A-13E, 15A, and 15B.

Such a database of information may be stored locally, e.g., in the data module 260 in FIG. 2, or stored remotely, e.g., in the remote data repository 280. The word flow annotation system can utilize publicly accessible information, e.g., information on the Internet, to retrieve auxiliary information associated with a rare word. In this situation, the system can access a network to send a query regarding a rare word to a resource on the Internet, such as a dictionary, an encyclopedia, or other similar resource. Such resources may be general (e.g., a general purpose encyclopedia such as Wikipedia) or specialized, such as e.g., an index of drugs such as one on rxlist.com or a mineralogy database (e.g., webmineral.com).

The objects of interests in the data repository can be updated by the AR system 200. As an example, the word flow annotation system 970 of the AR system 200 can be configured to remove words from the set of words the system identifies as rare words. This can be useful, for example, in situations where a user has specialized knowledge (e.g., a pharmacist is likely to know the names of many drugs), where a user becomes familiar with a word through association or usage (e.g., an employee of Acme Corporation likely does not need auxiliary information on Acme Corporation). An example word flow annotation system can remove a word from the set of rare words. This may be implemented by adding the word to the common word dictionary. This may be implemented as an additional check after system detects a rare word. If the detected rare word is found in the set of words to be removed, the system does not retrieve or display auxiliary information associated with the word.

A user may remove a particular word from the set of rare words through a UI interaction. The user's input may be entered through the user input device 504 when the rare word and its associated auxiliary information is displayed, for example. An example system can be configured to add a particular word to its common word dictionary after displaying the word and its associated auxiliary information for a certain number of times, e.g., three or five times, or some number configured by a user.

A UI interaction may be used, for example, to remove or add a rare word. For example, the user may say "Add the word phoropter as a common word," and the AR system can detect the user's speech and can add the word to the common word list and/or remove it from the rare word list.

Although these examples of updating the data repository are described with reference to rare words, similar techniques can also be used to update other objects of interests in the data repository.

Example Interactions with Auxiliary Information

The AR system 200 can be configured to support various user interactions with the auxiliary information. For example, the AR system can display, dismiss, or recall the auxiliary information. The user can also mark a portion of the auxiliary information or annotate the auxiliary information.

An AR system can be configured to display different pieces of auxiliary information associated with a particular object of interest for different occurrences of the object of interest. This may be useful when more auxiliary information is available than can be readily displayed. For example, an implementation can be configured to retrieve auxiliary information from website #1 upon the first occurrence of a rare word, from website #2 upon its second occurrence, etc. As another example, an implementation can be configured to display the use of a drug upon its first occurrence, the side effects of the drug upon its second occurrence, etc. Data useful in determining what piece of auxiliary information to display may be stored in a local data module 260 or a remote data repository 280. By sequentially providing different pieces of auxiliary information to the user, the AR system 200 can reduce the likelihood that the displayed auxiliary information will distract the user (e.g., by covering too much of the display's FOV) or be too hard to comprehend by the user (e.g., by displaying the auxiliary information for too little time to permit the user to read all of the information).

An AR system can be configured to display different auxiliary information associated with a particular rare word based on a user's configuration (e.g., according to the user's level of knowledge). For example, a system can retrieve and display specialized information on a drug if a user (e.g., a pharmacist) has configured the system for specialized drug information. Otherwise, the system can retrieve and display general information on a drug, which is likely appropriate for a user who did not configure the system for specialized drug information. A system can associate different sources of information with specialized or general information to provide appropriate information. For example, a dictionary can be a source of general information; a drug website can be a source of specialized information.

A word flow annotation system can be configured to display auxiliary information associated with a rare word based on the context of the speech. Additional words from the nearby context of the rare word can be used to determine which meaning is most likely, or what kind of auxiliary information may be most helpful. This may be useful to provide the user with information relevant to the speech, or in resolving ambiguity associated with a rare word. For example, if the name Acme Corporation appears in speech with a context of corporate officers as illustrated in FIG. 13D, an implementation can return the names and titles of Acme Corporation's officers as shown in box 1340. If the name Acme Corporation appears in speech with a context of stock prices as illustrated in FIG. 13E, the implementation can return stock information of Acme Corporation as shown in box 1354. As another example, the acronym "IMDB" can have a variety of different meanings such as, e.g., "internet movie database", "immigrant database", "in-memory database", etc. The word flow annotation system can determine the contextual information to determine the correct meaning. In one example, the word flow annotation system can determine the identity of the speaker and identity a meaning that correlate to the identity of the speaker. In another example, the word flow annotation system can use distinctive words surrounding the rare word to compute correlations between those words and the auxiliary information associated with a particular interpretation of that word. The word flow annotation system can identify and interpret words that are not among the most common N words to determine the context of speech. In the IMDB example above, the word "IMDB" is accompanied with words such as "visa", "legislation", and "deportation" in a speaker's speech. All these accompanying words are likely to be associated with the "immigrant database" interpretation of "IMDB" and not the "internet movie database" interpretation. Thus the AR system can automatically choose to display the auxiliary information of "IMDB" as "immigration database".

The word flow annotation system can compute correlation between context of a rare word and auxiliary information which is a candidate to be retrieved or displayed for a user. Processing associated with contextual analysis may be performed locally or remotely, e.g., by local processing module 71 or remote processing module 72. Contextual analysis can be based on the use of distinctive words surrounding the rare word to compute correlations between those words and the auxiliary information associated with a particular interpretation of that word. Distinctive words can be words that are not among the most common N words, for some value of N which may be smaller than the number of entries in a common word dictionary or a threshold of utterance frequency rank. A high correlation may indicate relevant auxiliary information. A low correlation may indicate irrelevant auxiliary information. For example, if the rare word is "IMDB" and other accompanying words include "visa", "legislation", and "deportation," words likely to be found in auxiliary information for the "Immigrant Database" interpretation and not in an "Internet Movie Database," "in-memory database," or some other interpretation, the system can be configured to display the auxiliary information for the "Immigrant Database" based on a higher correlation. This is an example of acronym disambiguation, a type of context-dependent auxiliary information.

The display of auxiliary information may be presented in a variety of ways. For example, a system can display only rare words and associated auxiliary information, as illustrated in box 1308 in FIG. 13A. A system can be configured to display a rolling transcript of a speech. In this configuration, words or even sentences that were missed can be quickly reread in case, for example, a user is momentarily distracted. In this disclosure, the term auxiliary information includes a transcript.

A speech train of a conversation partner may be displayed as a rolling text similar to presentation of end credit in a movie. Where available, the names of speakers may be displayed as well. Examples of how a system may obtain names of speakers are described above. An implementation can place information (e.g., transcript of speech or auxiliary information) in speech bubbles, e.g., text localized geometrically near the speakers, such as box 1308 illustrated in FIG. 13.

A system displaying a transcript of speech can highlight a rare word in some way, e.g., underlined, colorized, in bold text, etc. The system can permit a user to select, through a UI interaction, a current or past rare word and bring up, or bring back, associated auxiliary information.

An implementation may place auxiliary information (e.g., in speech bubbles or as a rolling transcript) so as to minimize a user's eye movement in order to access the information via a UI interaction. In this way, the UI is simplified and the user does not need to take his or her attention far from the speaker. The auxiliary information may be so placed as to make the reading action minimally visible to a conversation partner and, in so doing, provide less distraction and better communication while not revealing the user's access to auxiliary information. For example, an implementation capable of determining the location of a speaker may place auxiliary information next to the speaker. Images from the AR system's outward-facing camera can help determination of appropriate placement, for example, not obscuring, e.g., the face, the gesture, etc., of the speaker. An AR system can use the process flow 800 illustrated in FIG. 8 to determine the placement of auxiliary information display. For example, the recognized object in block 2310 can be the speaker whose speech is to be processed for annotation.

As another example of reducing distraction experienced by the user or a conversation partner, if auxiliary information is presented in audio, the AR system can present the information at a volume loud enough for the user, but not the conversation partner, to hear, and/or present information when neither the user nor the conversation partner is speaking.

The retrieved auxiliary information can be displayed to the user by the display of the AR system 200. The displayed auxiliary information may be left visible until a condition is met. For example, the information displayed may be left visible for a fixed amount of time, until the next rare word (or another object of interest) is to be displayed, or until dismissed by a user action. The user action may be passive, for example, eye movements. An inward-facing camera (e.g., camera 462 in FIG. 4) can be used to detect or track a user's eye movements. A display may be dismissed via eye tracking after the user has been observed by the system to have tracked the entire display area of the auxiliary information. For example, if the auxiliary information is text, the system can track the user's eye movements through the text (e.g., left to right and top to bottom). A display may be dismissed via eye tracking after the user has been observed by the system to have looked away from (or to not look at) the display area of the auxiliary information. The user action may be active, for example, an input action through the user input device 504 in FIG. 4. A word flow annotation system can be configured to support a customized set of user interface (UI) interactions for a particular user. UI interactions may take the form of a UI element analogous to a button that is actuated either with a finger, a pointer or stylus of some kind, by the gaze and subsequent fixation on the button with the eyes, or others. The button can be a real physical button or one displayed in AR. UI interactions may take the form of a head pose, e.g., as described above in connection with FIG. 4. An example of UI interaction detection is described above in connection with FIG. 10.

A word flow annotation system can prompt a user to delay dismissal of an auxiliary information display. For example, the system may reduce the brightness or change the color scheme of the displayed auxiliary information to notify the user that the display will be dismissed shortly, e.g., a few seconds. A UI interaction such as those described above may be used to postpone the dismissal. For example, if the AR system, through eye tracking, detects that the user is actively viewing the auxiliary information, the AR system can postpone the dismissal.

A UI interaction such as those described above may also be used to recall auxiliary information that has been dismissed. For example, an input action through the user input device can be used to recall the most recently displayed auxiliary information, or used to select a particular item of prior-displayed auxiliary information for recall.

While displaying the auxiliary information, the AR system can also allow a user to annotate the auxiliary information. As an example, the AR system can allow a user to mark a portion of the auxiliary information for viewing later. For example, a user can highlight a portion of an explanation of a rare word for reading in more depth. As another example, while a user is watching a professional basketball game and the commentators are talking about a particular player. The AR system can present a product endorsed by that player as auxiliary information. The user can save or bookmark the product presented by the AR system and decide whether to purchase the product later.

The user can also annotate the object of interest by adding or drawing virtual content associated with auxiliary information. For example, a user can add notes or figures to the auxiliary information, or remove a portion of the auxiliary information (e.g., by erasing or crossing out the portion) using the user input device 466 or hand gestures. The AR system can save the user's annotation and render the user's annotation together with the auxiliary information when the object of interest is detected at a later time.

Example User Experiences for Interactions with an Object of Interest

FIGS. 13A-13G illustrate examples of interacting with an object of interest and auxiliary information of the object of interest.

Examples of Presenting Virtual Content Based on Presence of a Keyword

Figure 13A:
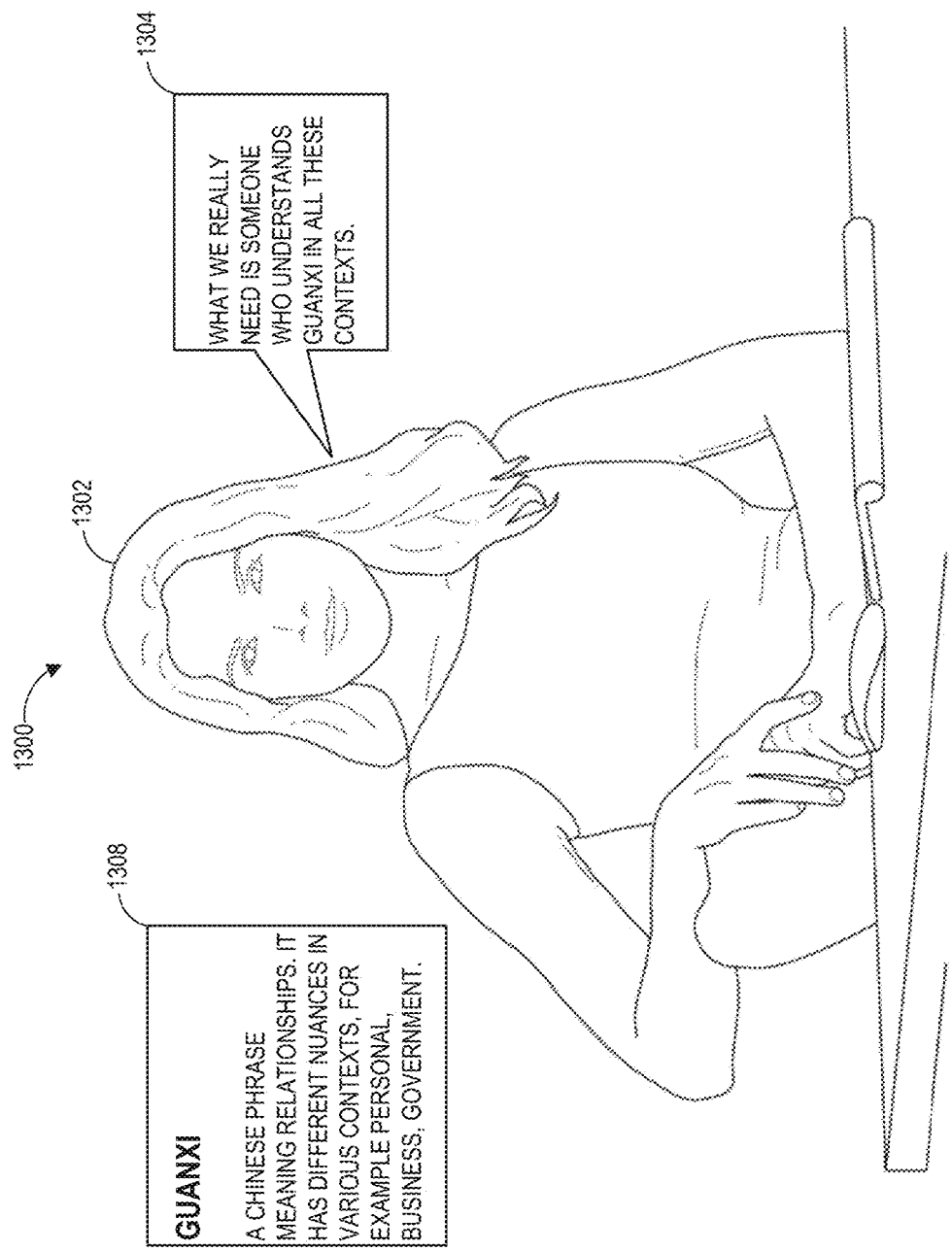
FIGS. 13A-13G illustrate examples of interacting with an object of interest and auxiliary information of the object of interest.

FIG. 13A illustrates an example of detecting a keyword and presenting auxiliary information for the keyword. In FIG. 13A, a word flow annotation system 970 of a user's AR system can be configured to detect keywords and provide auxiliary information of the keywords. To avoid cluttering the information displayed to the user of the AR system, the AR system can provide auxiliary information only upon detection of rare words.

In FIG. 13A, a user (not shown) wearing an ARD can perceive a woman 1302 in his environment. The woman speaks a sentence shown in a call-out box 1304. Within the sentence is a word "guanxi" which can be a rare word. The ARD can capture the sentence spoken by the woman (e.g., via the audio sensor 232), convert the sentence to text, detect "guanxi" as a rare word, retrieve auxiliary information (e.g., a definition) associated with "guanxi," and display the auxiliary information on a display (e.g., display 220). In the illustration, the auxiliary information is displayed in the box 1308. The user sees this box 1308 as part of virtual content presented by the AR display 220. The auxiliary information in box 1308 can help the user understand what the woman means by using the word "Guanxi".

Examples User Experiences in a Telepresence Session

A plurality of users of a plurality of AR systems can carry on a conversation remotely through the aid of the systems. For example, as illustrated in FIG. 12, two users (of devices 100a and 100b) at two physical locations (such that they do not see or hear each other directly, without the aid of a man-made device) can both be equipped with an AR device which may be equipped with the word flow annotation system 970. Each user's speech may be captured by an audio sensor of the user's respective device and transmitted through the network 1290. User C's speech may be displayed on user B's device, for example as a transcript or as rare words plus auxiliary information, and vice versa.

A word flow annotation device can convert speech to text locally and transmit only the converted text through the network 1290. The other user's device can either display the text or convert the text back to speech. This can be advantageous where the bandwidth of the network 1290 is constrained because a smaller amount of data is required to transmit text than to transmit corresponding speech. A word flow annotation system may contain voice information of a user-speaker and convert text back to speech using that voice information. In this way, the reconstructed speech may sound like the speaker's own voice.

A word flow annotation system can also enhance a telepresence conversation through images presented on the AR display 220. For example, an AR display can present an avatar of a remote speaker along with auxiliary information to engage a participant's visual as well as auditory senses. As described in connection with FIG. 4 above, an ARD equipped with an inward-facing imaging system 462 can capture images for substituting the region of a wearer's face occluded by an HMD, which can be used such that a first caller can see a second caller's unoccluded face during a telepresence session, and vice versa. World map information associated with a first user may be communicated to a second user of a telepresence session involving word flow annotation systems. This can enhance user experience through the creation of images of the remote user to be seen by an ARD wearer.

In a telepresence application, capturing ambient sounds is performed by a device associated with a user-speaker, rather than a device associated with a user-listener in the in-person scenario. Detection of presence of speech and conversion of speech to text can be performed by device associated with either user. The source of speech can be determined based on the device that capture the sound, e.g., when user A's device captures the sound, user A is speaking.

Figure 13B:
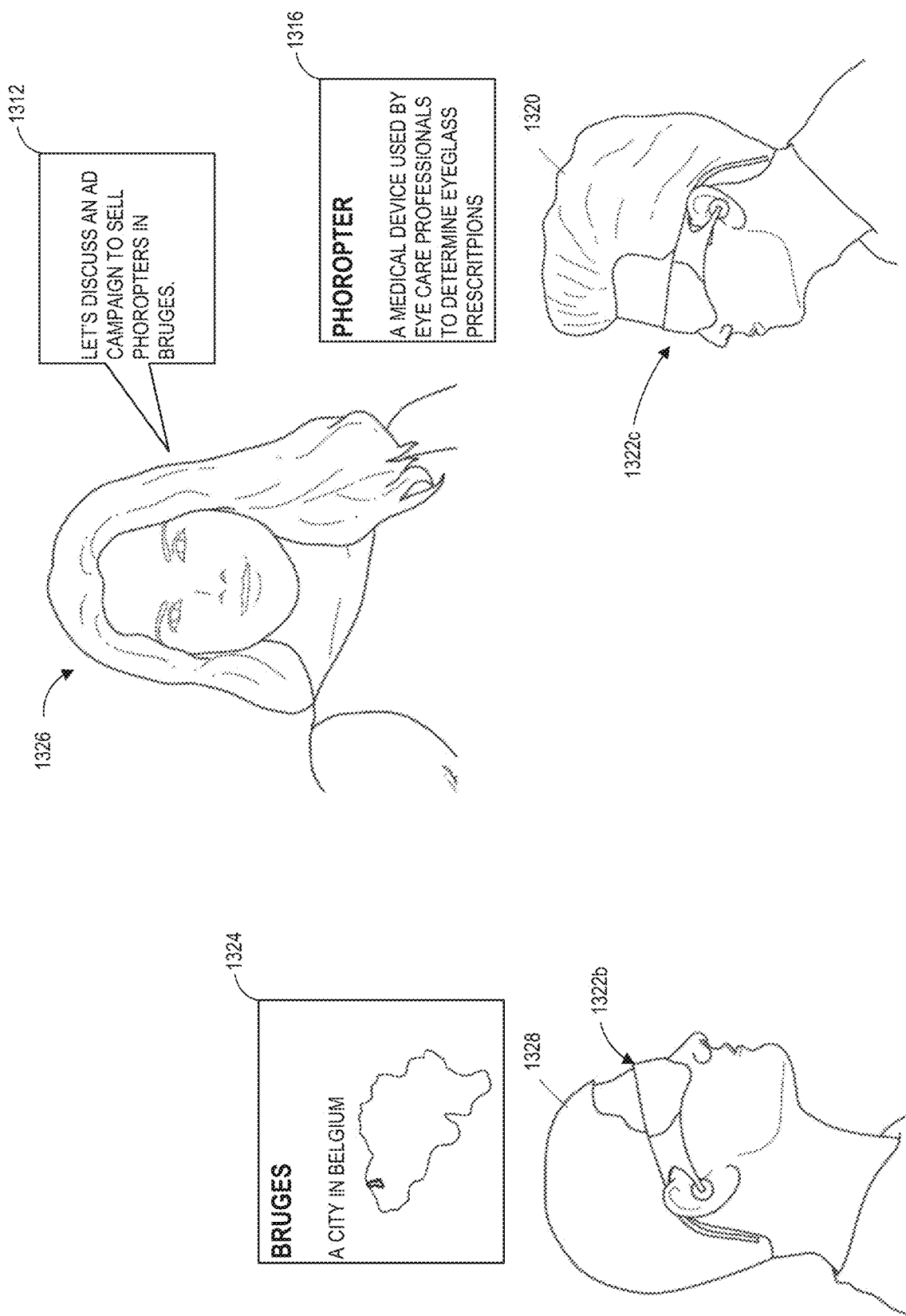

FIG. 13B shows another example application of a word flow annotation system in a telepresence session. In this example, a woman 1326 is in a marketing group meeting with users 1328 and 1320. The users 1328 and 1320 are wearing their respective ARDs 1322b and 1322c. The ARDs 1322b and 1322c can include at least a portion of the AR system 200 shown in FIG. 2.

The woman 1326 states (as shown in the callout box 1312, also sometimes referred to as a speech bubble): "Let's discuss an ad campaign to sell phoropters in Bruges." The ARDs 1322b and 1322c can capture this audio and identify keywords in the audio (e.g., via the word flow annotation system 970. In some embodiments, the woman may have an audio device (e.g., a microphone) in her vicinity or wear an ARD such that the audio device or the ARD of the woman can capture the audio and process the audio stream (e.g., convert it to text or identify keywords), alone or in combination. In some embodiments, at least a portion the audio processing such as converting the audio file to text or identifying keywords can be performed by the remote computing system 1220 which can avoid duplicative processing of the same audio stream by each user's ARD.

The ARDs 1322b and 1322c can display auxiliary information associated with the woman's speech. In this example, the word "phoropter" (a medical device used by eye care professionals to determine eyeglass prescriptions) is determined to be a rare word for the user 1320, and the ARD 1322c displays a definition of the word "phoropter" in a box 1316. If the word "phoropter" is not a rare word for a user of the ARD, the ARD may not display the box 1316 for the user. In this example, the word "phoropter" is not a rare word for the user 1328 because he is an engineer in the eye care division. As a result, the ARD 1322b will not present the auxiliary information (shown in the box 1316) to the wearer 1328. Continuing with this example, the ARD 1322b can determine that the word "Bruges" (a city in Belgium) is a rare word for the user 1328 and can display a graphic 1324 providing information about the city and a small map of the location of the city.

Language Translation

Figure 13C:
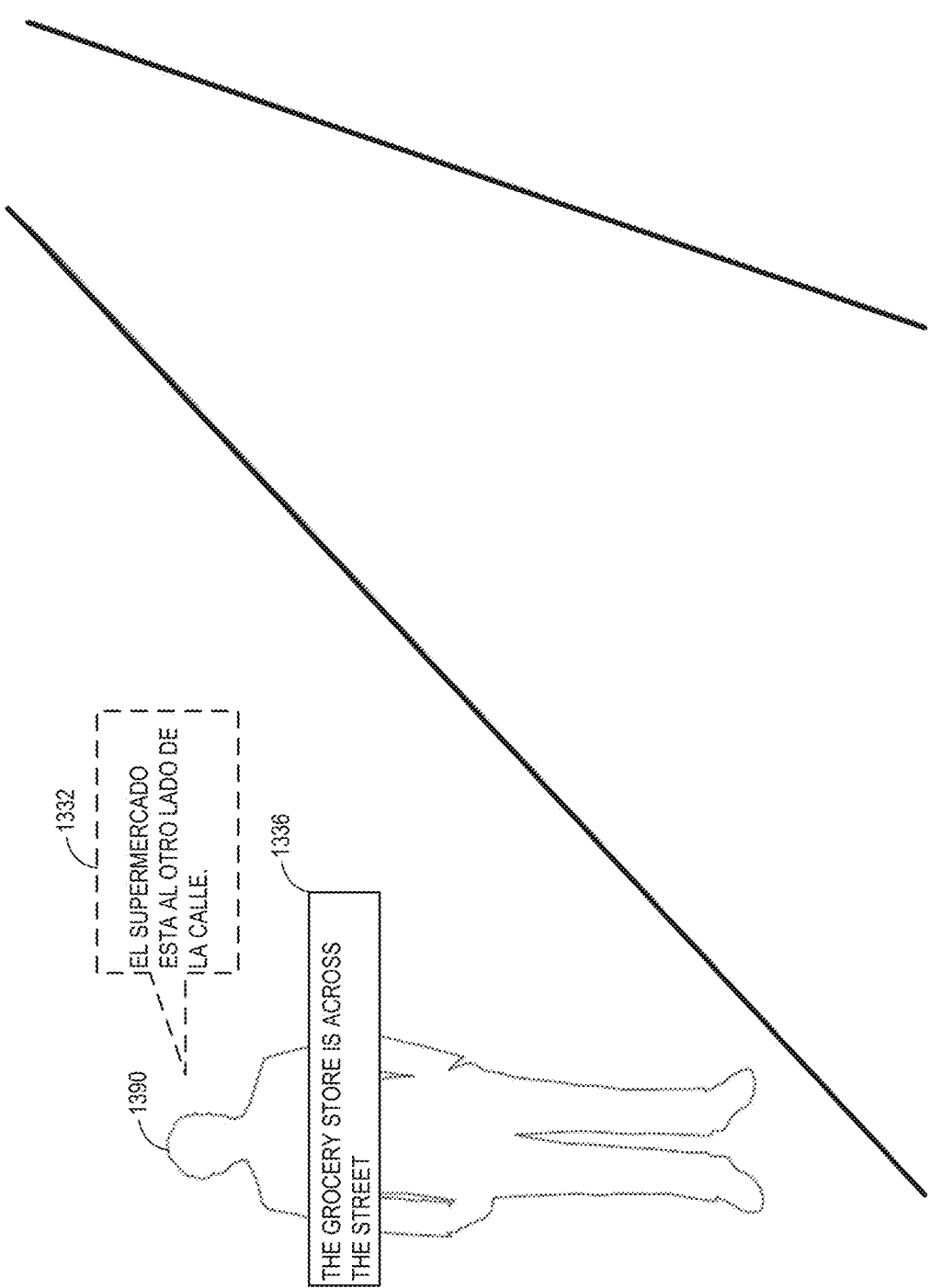
Figure 13D:
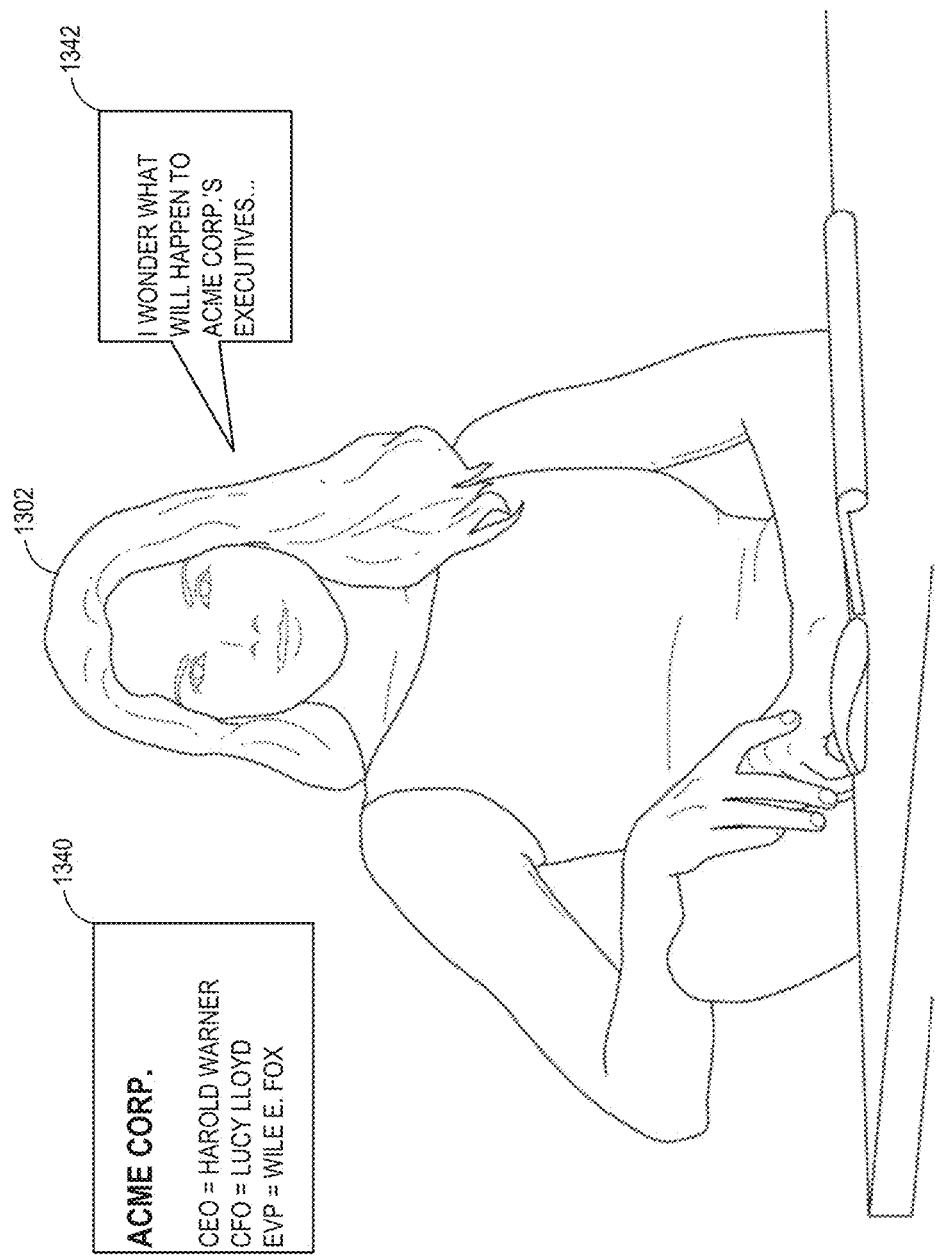
Figure 13E:
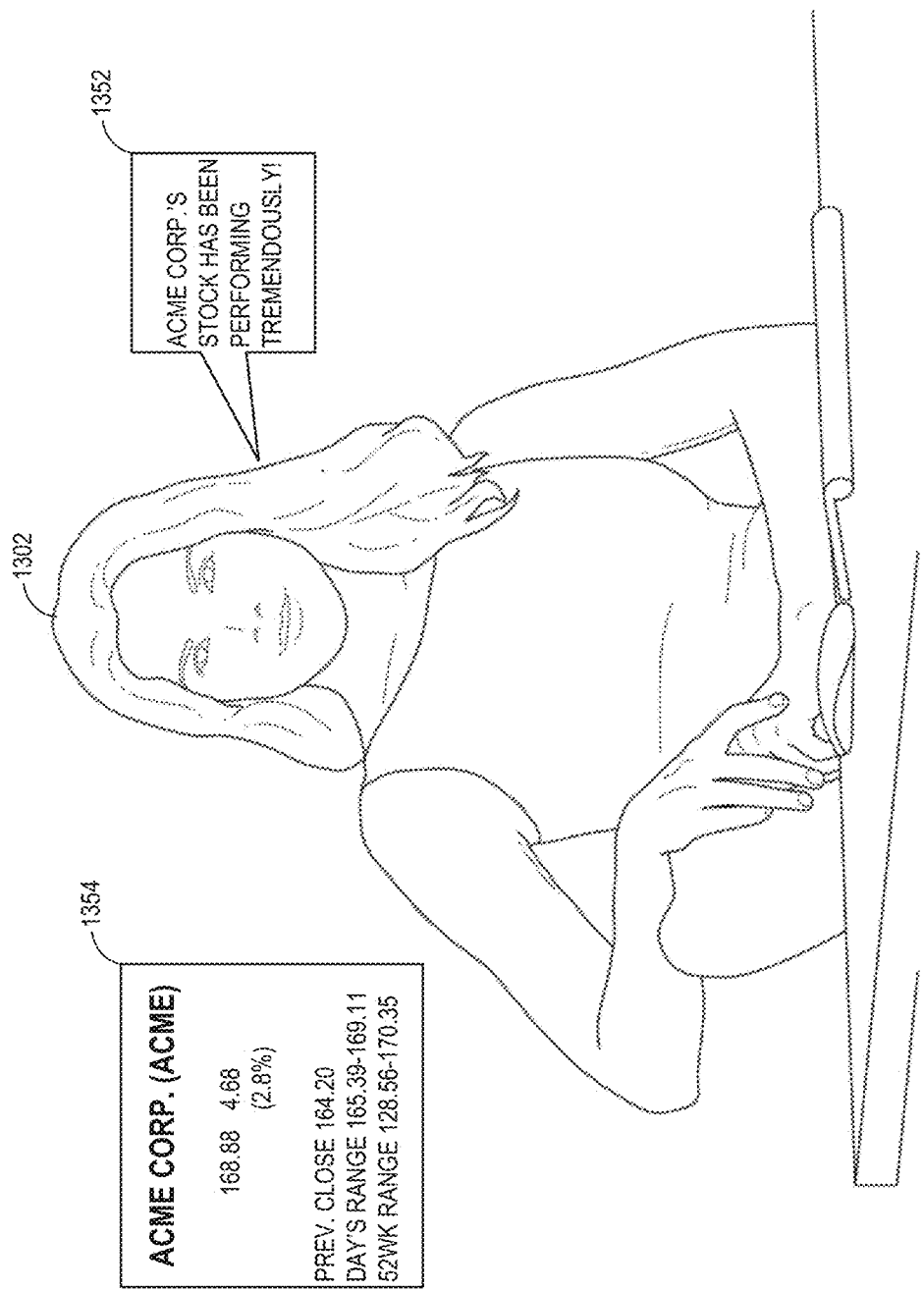

A word flow annotation system can be used for language translation. FIG. 13C shows another example application of a word flow annotation system where the word flow annotation system can translate a phrase in a first language (e.g., Spanish) into a second language (e.g., English for an English-speaking user). In this example, an English-language speaking user (not shown) of the AR system 200 is visiting a foreign country and is listening to a speaker 1390 say "El supermercado está al otro lado de la calle" as shown in the dashed box 1332. The AR system 200 may, but need not, display the speaker's speech to the user (e.g., the box 1332 typically is not displayed to the user of the AR system but can be displayed in some implementations). The AR system 200 determines that the speaker's 1390 speech is in Spanish, translates the speech into English ("The grocery store is across the street"), and displays a caption 1336 (or a speech bubble) with the translated text.

The AR system can support translations of one language to another using the local processing and data module 260, the remote processing module 270, or the remote data repository 280, alone or in combination. For example, the AR system may implement a word flow annotation system 970 which can translate a language other than a user's dominant language into a user's dominant language. A user's dominant language can be the user's native language or the user's preferred language in a conversation. A language other than the user's dominant language can be considered a foreign language. In this configuration, the user can select to see translations of incoming words rather than contextual auxiliary information, such as illustrated in FIG. 13C. A user can select to see a transcript of detected speech in the user's dominant language, in the speaker's language, in both languages (e.g., in an interlinear format), a transcript mixing the languages (e.g., common words in the speaker's language and uncommon words in the speaker's language or in both languages), etc. A system can support customization of a common foreign word dictionary, e.g., allowing a smaller size than a common word dictionary in the user's native language. For example, a user may select to see translations of any word less common than the 1,000 or 2,500 (or some other number) most used words in a particular language. The same user may select a common word dictionary in the user's own language to have a size of 7,000 or 8,000 (or some other number) words.

A word flow annotation system can not only help a user understand speech in the foreign language, it can also help a user speak the foreign language. For example, a system can be configured to translate a user's own speech into a foreign language. This translation can be applied to a user's whole speech (e.g., a whole sentence) or selected words in the user's speech. For example, a user may prompt the system to provide translation by saying "What is the word for 'patent'?" (or through another UI interaction). The system can respond by providing the word for "patent" in the foreign language of interest, e.g., on display 220. The user can see the word in the foreign language and speak the word himself or herself. A word flow annotation system can include an audio amplifier (e.g., a speaker 240) to provide the translated word in audio. In one implementation, the user only may hear this audio through, e.g., an audio amplifier in the form of an earphone. In another implementation, the user as well as a conversation partner may hear this audio through a loud speaker.

Examples of Presenting Auxiliary Information Based on Contextual Information

FIGS. 13D and 13E illustrate examples of presenting auxiliary information based on contextual information. As described in FIG. 13A, a user (not shown) wearing an ARD can perceive the woman 1302. The woman 1302 may be present in a user's physical environment. The user may be in a business related conversation with the woman 1302. As shown in the text box 1342 in FIG. 13D, the woman 1302 says "I wonder what will happen to Acme Corp.'s executives." The user's ARD can capture this sentence spoken by the woman 1302. The word flow annotation system 970 can analyze the speech of the woman 1302 and detect a keyword in the sentence spoken by the woman 1302. In this example, because the user is in a business related conversation, the ARD can identify "Acme Corp.'s executives" as the keyword because it is the business related. Once the ARD has determined the keyword, the ARD can access and retrieve auxiliary information associated with the keyword. For example, the ARD can perform a search in a data repository (e.g., the remote data repository 280) or to perform a public database search. As shown in the text box 1340, the ARD has retrieved the names of Acme Corp's executives. The ARD can display the names as auxiliary information as depicted in the box 1340.

In FIG. 13E, the woman 1302 says "Acme Corp's stock has been performing tremendously!" Because the user is in a business related conversation, the ARD can identify business information mentioned in the woman's 1302 speech as a keyword. In this example, the ARD identifies that the phrase "Acme Corp.'s stock" is the keyword (rather than the word "tremendously") because this phrase is business related. Accordingly, the ARD can search or access the auxiliary information associated with the keyword. As shown in the text box 1354, the ARD can present current stock price, percentage of increase, fluctuation ranges, and previous closing price to the user as virtual content.

Figure 13F:
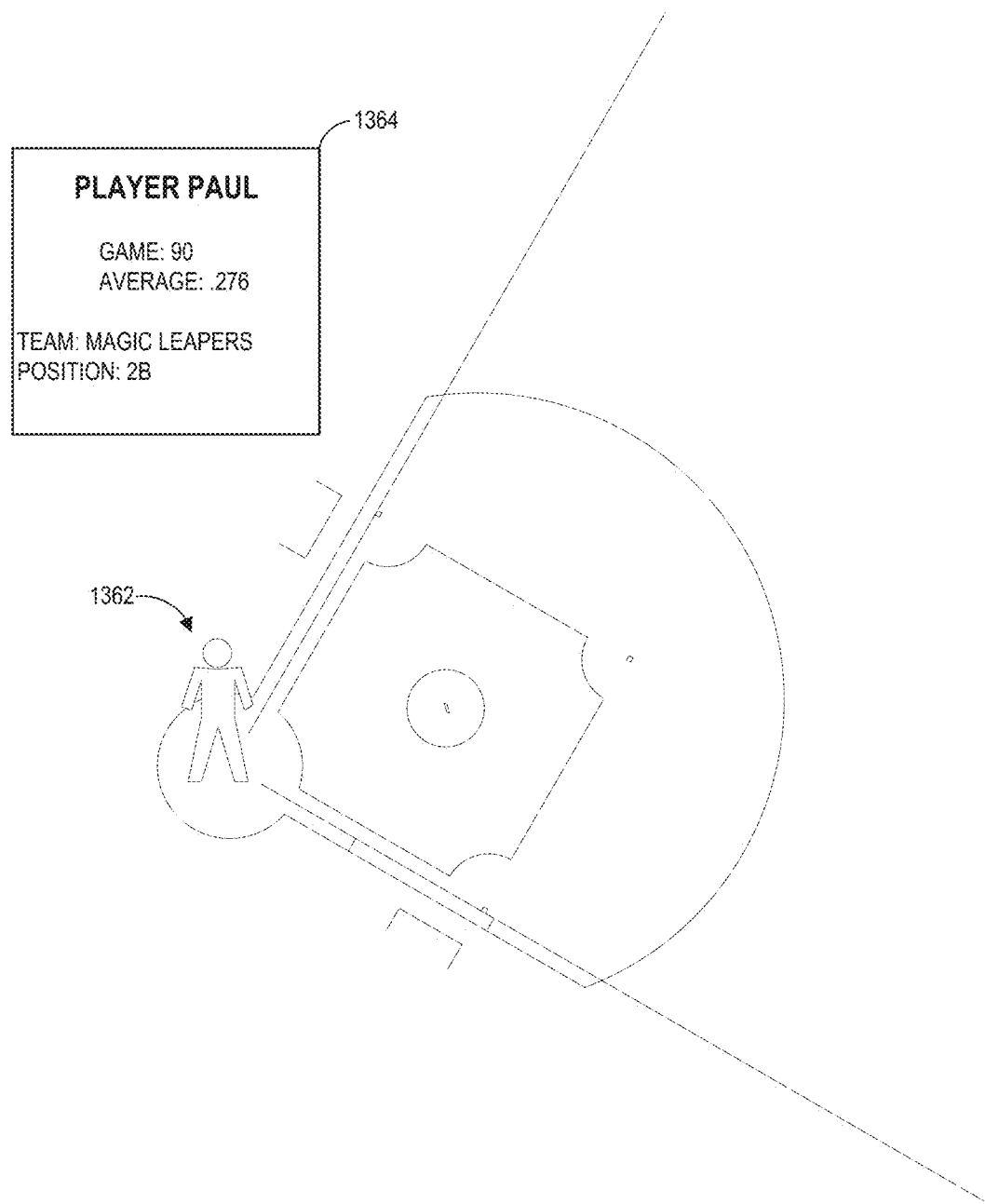

FIG. 13F illustrates an example of presenting auxiliary information associated with an object of interest based on contextual information. A user (not shown) can watch a baseball game while wearing an ARD. Because the ARD can include a see-through display, the user can watch the baseball game live or playing on a display that is external to the ARD (such as, e.g., on a computer screen or a television). The baseball game may also be rendered by the ARD in some situations. While the user is watching the baseball game, the user can perceive that player Paul 1362 is up to bat and the commentators are talking about player Paul. Accordingly, the ARD can determine that player Paul 1362 is an object of interest. In this example, the ARD can determine the object of interest using a variety of techniques, alone or in combination. For example, the ARD can detect the frequently mentioning of player Paul 1362 in the commentators' speech and determine that it is a factor that player Paul is the object of interest. As another example, the ARD can keep track of which player is up to bat by monitoring game progress and identify the player who is up to bat as the object of the interest. As yet another example, while the user is watching the baseball game on a television, the ARD can use the outward-facing imaging system 464 to acquire images of the baseball game as displayed on the television. The ARD can parse the images using one or more object recognizers 708 and identify the player that is up to bat from the acquired images.

Once the ARD determines that player Paul 1362 is the object of interest, the ARD can retrieve and present information related to player Paul 1362 to the user. As shown in the box 1364 of FIG. 13F, the ARD can present player Paul's baseball-related information such as game statistics (e.g., the number of games participated and the batting average), the position in the field, and the team to which player Paul 1362 belongs.

Figure 13G:
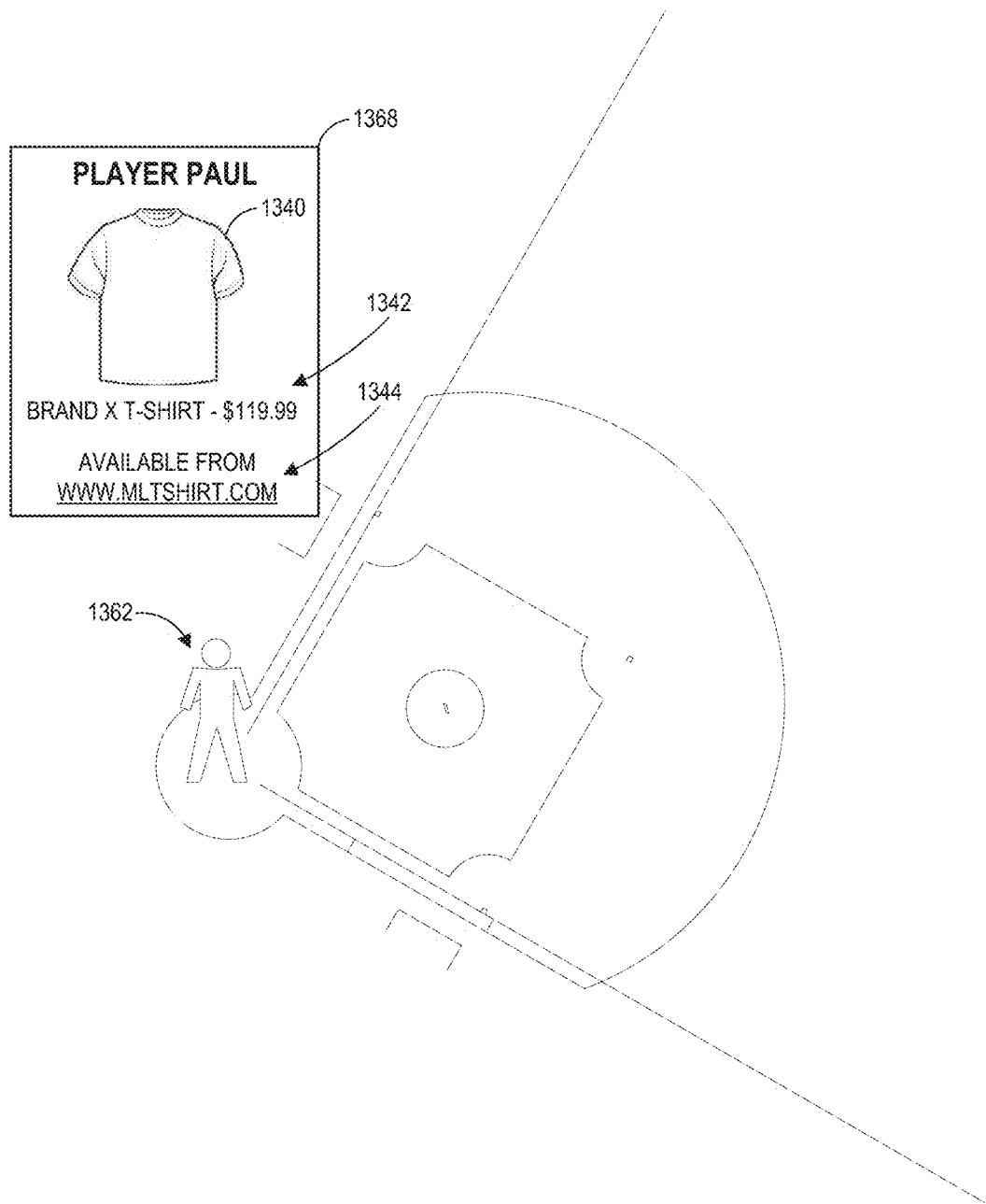

Auxiliary information can include a variety of information, such as, e.g., statistics, status, explanations, product information, additional details/facts associated with the object of interest, and so on. FIG. 13G illustrates an example where auxiliary information includes product information. As described in FIG. 13F, the ARD can determine that player Paul 1362 is the object of interest. In addition to or in alternative to displaying player Paul's 1362 statistics (as shown in FIG. 13G), the ARD can determine a product (e.g., the t-shirt 1340) which player Paul 1362 (or his team) endorses and display the product information (such as an image of the t-shirt 1340, a price 1342 of the t-shirt 1340, and a website 1344 from which the t-shirt 1340 can be purchased) in the annotation box 1368. To determine which product to render and access product information, the ARD can perform a search in a public database or in a data repository associated with the ARD to find an advertisement in which player Paul 1362 appears. The ARD can accordingly determine the products identified in the advertisement as the product that player Paul 1362 endorses. In some situations, player Paul 1362 may endorse more than one product. The ARD may pick a subset of products to present as auxiliary information. For example, the ARD may pick the products that player Paul 1362 has endorsed in the past year. The ARD can also pick the products based on the contextual information. For example, since the user is watching a sports event, the ARD may determine sports goods that are endorsed by player Paul 1362 to present information of these sports goods to the user. The ARD may be configured to accept a purchase decision from the user. For example, if the user wishes to purchase the t-shirt 1340, the user may, e.g., say "buy the t-shirt" or actuate a user input device to select the link to the website 1344, and the ARD will accept the user's purchase selection and take steps to complete the transaction (e.g., by accessing the website 1344 and automatically placing a purchase order for the t-shirt 1340).

Example Processes for Annotating a Speech

Figure 14A:
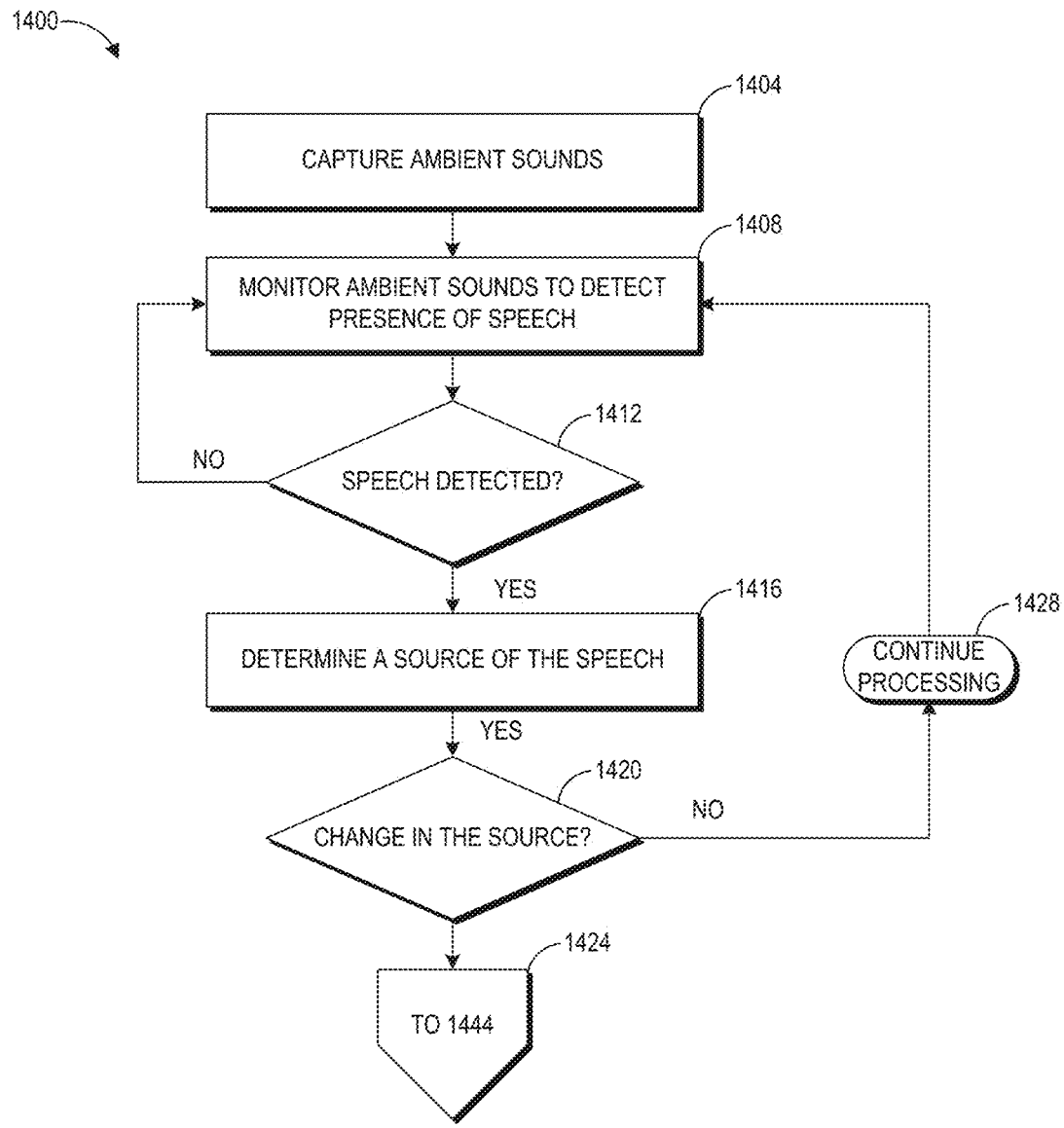
FIGS. 14A and 14B show an example process of annotating a speech.
Figure 14B:
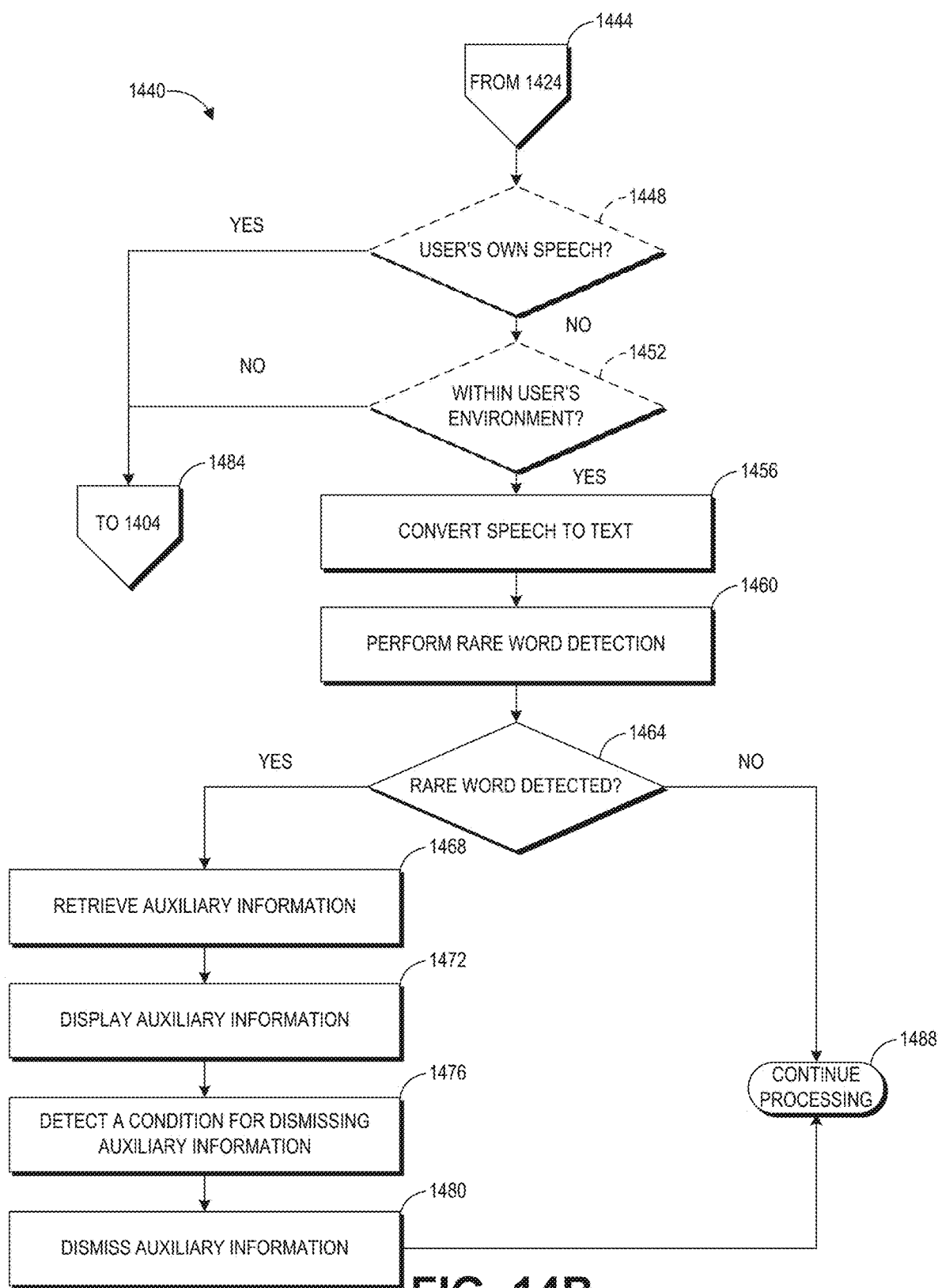

FIGS. 14A and 14B show an example process of annotating a speech. The processing flow 1400 can be performed by the AR system 200 as shown in FIG. 2.

At block 1404, an audio sensor of the system can capture ambient sounds. The ambient sounds can include speeches of one more persons in a user's environment. The speech may be a user's speech, a person (other the user's speech), or a speech from an audio visual content (e.g., a movie, a music, etc.) The ambient sounds may also include background sounds such as noise.

At block 1408, the system monitors ambient sounds to detect the presence of speech. This detection processing may be done locally (e.g., by local processing module 260) or remotely (e.g., by remote processing module 270). The system can detect the presence of speech by identifying a stream of words in the captured ambient sounds. The system can also initiate or perform the detection in response to a user input, such as a user's pose, or an input from the user's input device 466 indicating the presence of a speech.

At block 1412, the system determines whether speech is detected. If speech is detected, the flow continues to block 1416. If speech is not detected, the flow returns to block 1408 (as shown) or to block 1404.

The operations in boxes 1404 through 1412 may be performed continuously or periodically (e.g., at a sampling frequency) when the system and the audio sensors are turned on, e.g., when the word flow annotation function is enabled. These operations can be performed in parallel to other blocks in flowcharts 1400 and 1440 (e.g., as background tasks driven by a timed interrupt). They are shown as discrete boxes in a processing flow sequence for the purpose of illustration. But they are not limited by the illustrated sequence. Many processing flows other than the examples described above are possible at the discretion of a system designer.

At block 1416, the AR system can determine a source of the detected speech. The source of the speech can be relevant, for example, if the system is configured to not process a user's own speech, or if the system is configured to process speech only from persons in the AR system's FOV (speech coming from people outside of the FOV can be discarded and not processed further). For example, the AR system may process speech from people in front of the user and ignore speech from people behind the user. The source of the speech can also be used to determine the display locations of auxiliary information or texts of the speech. For example, the AR system may display the auxiliary information associated with the speech or a transcription of the speech near the person who is speaking.

At block 1420, the system determines whether there has been a change in the source of speech. For example, when two users are in a conversation, the system can determine whether a sentence comes from the previous speaker or another speaker. If there has been a change, the flow continues through block 1424 to block 1444. If there has not been a change in the source of speech, the flow moves to block 1428 to continue word flow annotation processing, which can include capturing ambient sounds (block 1404), detecting presence of speech (block 1408), as well as processing steps shown in FIG. 14B. For example, if the system determines the same speaker continues to speak, the system can continue to perform functions starting from block 1456 in addition to continuing to capture sound and detect speech.

At block 1448, the example system can determine whether the detected speech is the user's own speech. If it is, and if the system is configured to not process the user's own speech, processing may return to block 1404 through block 1484. If the detected speech is not the user's own speech, the flow continues to block 1452. At block 1452, the system determines if the speech is from a source within the user's environment. The user's environment may include, for example, a person whom the user is looking at or conversing with, as determined through information captured by inward-facing imaging system 462, outward-facing imaging system 464, or stationary cameras. An outward-facing imaging system 464 can provide information including the position of a speaker relative to the user. An inward-facing imaging system can provide information including the direction in which the user is looking. By using information from both cameras, a word flow annotation system can determine at whom a user is looking.

A user's environment may comprise, as another example, speech above a loudness threshold. A word flow annotation system can support a configurable loudness threshold, e.g., 60-70 dBA for normal conversations, 30-40 dBA for whispers, where dBA is the A-weighted decibel measurement scaled to account for the varying sensitivity of the human ear to different sound frequencies. Speech at or above the loudness threshold can be within the user's environment and can be processed by the word flow annotation system as described below. Speech below the loudness threshold may not be within the user's immediate environment (e.g., background conversation or speech from a distant source) and may not be processed.

A user's environment may comprise, as a third example, speech from a particular source. For instance, a user may be carrying on a conversation with a remote person through a speakerphone in an office. The user may not be looking at the speakerphone, such as when the user is looking at a document or a computer screen while carrying on the conversation through the speakerphone. The AR system can allow the user to designate the speakerphone as the user's environment so that the audio will be processed, even though the user's FOV does not include the speakerphone. As another example, a tourist user of a workflow annotation system may wish to annotate a tour guide's speech while the tourist user enjoys the view of a tour site, e.g., not (or occasionally) looking at the tour guide. A word flow annotation system can allow the tourist user to designate the tour guide as the user's environment. The tour guide's speech may be in a language foreign to the tourist user. Such designation can be language-based, e.g., a foreign language.

An implementation of a word flow annotation system can facilitate a user's changing environment. In the speakerphone example, the system can be configured to designate the speakerphone as the user's environment for the duration of the conversation, and be reconfigured to determine the user's environment based on a loudness threshold after the conversation ends.

As another example, if a user's environment is determined based on a loudness threshold and limited to sources of speech within the user's FOV, an implementation can buffer some amount of captured speech above the threshold from outside of the user's FOV. This buffered information can be retrieved and processed, for example, if the user turns to look at the source of the captured speech that was outside of the user's FOV.

For speech within the user's environment, at block 1456, the system can convert speech to text as described above.

At block 1460, the system can perform rare word detection on the converted text. At block 1464, the system determines whether a rare word is detected. The functions performed in these boxes 1460 and 1464 are described in details in the preceding sections.

If a rare word is not detected, the flow moves to block 1488 to continue word flow annotation processing, in a manner similar to the description of block 1428 above.

If a rare word is detected, at block 1468, the system can retrieve auxiliary information associated with the rare word. At block 1472, the system can display retrieved auxiliary information on the AR display of the system. At block 1476, the system can detect a condition for dismissing the auxiliary information. When such a condition is detected, at block 1480, the system can dismiss the display of the auxiliary information and continue on to block 1488. The functions performed in these boxes are described above and with reference to FIGS. 13A-13G.

Similar to what is noted above with respect to boxes 1404 through 1412, operations in flowchart 1440 may be performed in parallel to other boxes flowcharts 1400 and 1440. They are shown as discrete boxes in a processing flow sequence for the purpose of illustration, but they are not limited by the illustrated sequence. For example, a system may be displaying auxiliary information for a rare word (at block 1472) while the system converts additional speech to text (at block 1456), performs rare word detection on additional speech (at block 1460), or retrieves auxiliary information on another rare word (at block 1468). As another example, a system can convert speech to text (at block 1456) while it retrieves auxiliary information for a prior-detected rare word (at block 1468). Many other processing flows are possible at the discretion of a system designer.

Example Processes of Annotating an Object of Interest

Figure 15:
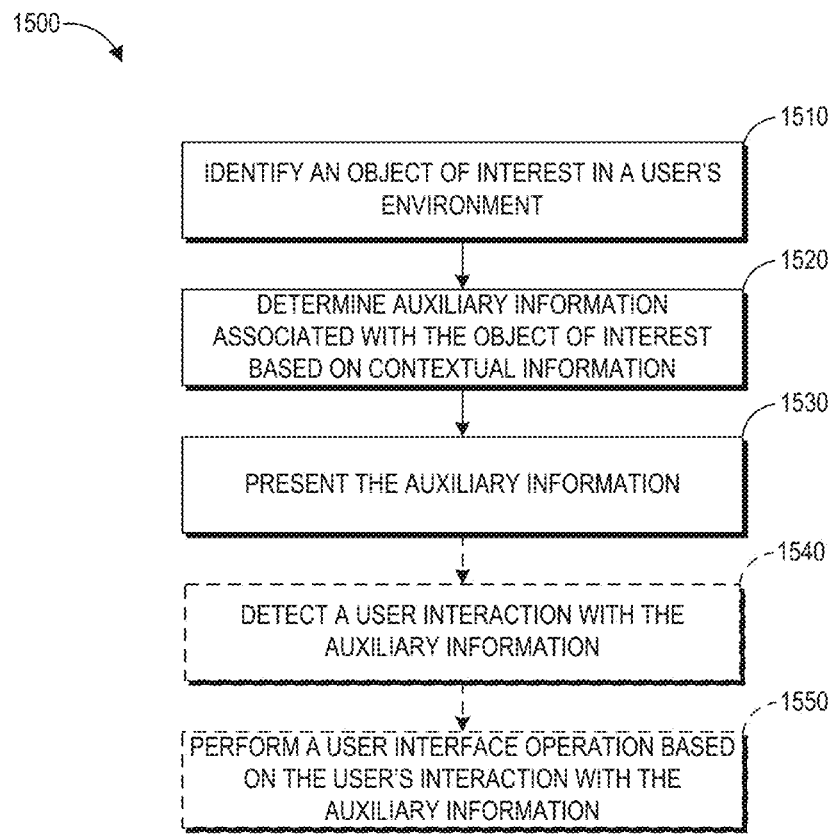
FIG. 15 illustrates an example process of interacting with an object of interest and auxiliary information of the object of interest.

FIG. 15 illustrates an example process of interacting with an object of interest and auxiliary information of the object of interest. The example process 1500 can be performed by the AR system described herein.

At block 1510, the AR system can identify an object of interest in a user's environment. The object of interest can include a person, an object (physical or virtual), or an ambient sound, etc. The AR system can identify the object of interest using images acquired from the outward-facing imaging system 464, the inward-facing imaging system 462, or stationary cameras. The AR system can also identify the object of interest by analyzing audio information acquired from the microphone 232 or received from another device (e.g., another user's ARD, a microphone in the environment), etc. As described with reference to FIG. 13F, the audio information can be used in combination with the images to determine the object of interest. In some implementations, the AR system can identify the object of interest based on contextual information. As described herein, the contextual information may include information associated with the user, the object of interest, the user's environment, the object or persons in the user's environment, etc. As another example, an object in a user's environment may be rare (and thus may be an object of interest) to a user because of the user's experience but may not be rare to another user. Tissue forceps may be rare for a user because the user does not often see them in everyday life, but they may not be rare for a surgeon.

At block 1520, the AR system can determine auxiliary information associated with the object of interest based on contextual information. The AR system can access auxiliary information from one or more data repositories, such as, e.g., the remote data repository 280, a data repository local to an AR device, or a data store that is managed by another computing device. The AR system can also determine the auxiliary information by performing searches with a search engine. The AR system can present only a portion of the auxiliary information based on the contextual information. For example, when a user is watching a sports event, the auxiliary information of a player may include sports related information (e.g., game statistics) of the player rather than other types of information (e.g., the information on the family members of the player). The AR system can also access or search for auxiliary information based on the contextual information. For example, if a user is in a conversation related to stock trading, when a user hears the phrase "Shop Corp.", the AR system can access the stock information of "Shop Corp." But if the user is in a conversation about shopping, the AR system can access products that are sold by Shop Corp., when the AR detects the phrase "Shop Corp."

At block 1530, the AR system can present auxiliary information to the user. The auxiliary information can be presented as virtual content overlaid on top of the user's physical environment. For example, while a user is in a conversation with another user who is physically present in the user's environment, the AR system can show a speech bubble right next to the other user when the AR system detects a rare word spoken by the other user. Where the conversation occurs in a telepresence session, the AR system can present auxiliary information near a virtual avatar of the other user.

At block 1540, the AR system can optionally detect a user interaction with the auxiliary information. For example, a user can add notes/drawings to the auxiliary information. A user can also dismiss the auxiliary information, request for additional auxiliary information (e.g., using a hand gesture to expand the user interface element showing the auxiliary information), or mark/edit the auxiliary information.

At block 1550, the AR system can optionally perform a user interface operation based on the user's interaction with the auxiliary information. For example, the AR system can hide the auxiliary information in response to a user input for dismissing the auxiliary information. The AR system can also display the user's notes or highlight a portion of the auxiliary information in accordance with the user interaction at the block 1540.

Examples of Threads Identification

Figure 16A:
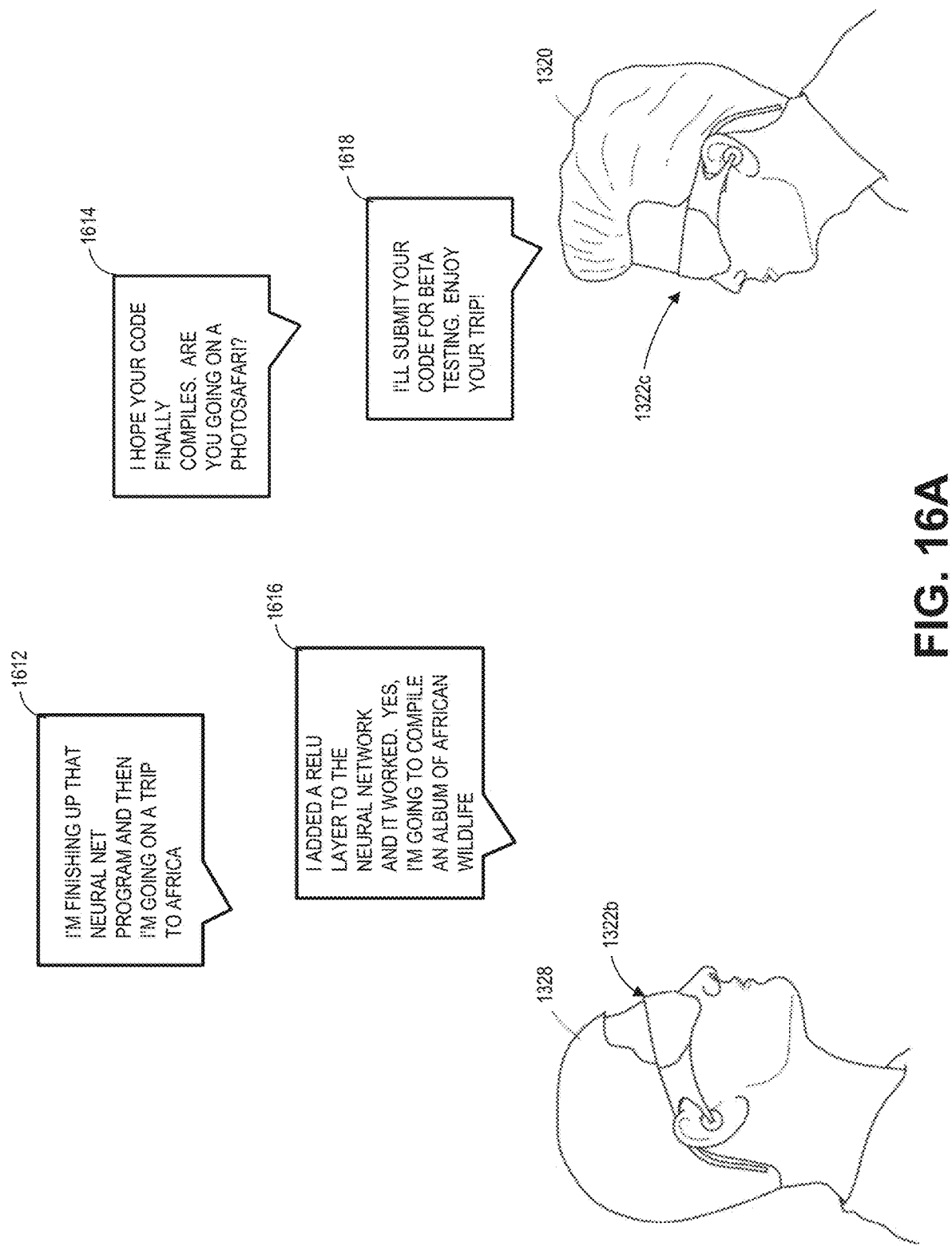
FIGS. 16A and 16B illustrate an example of threads identification based on keywords.
Figure 16B:
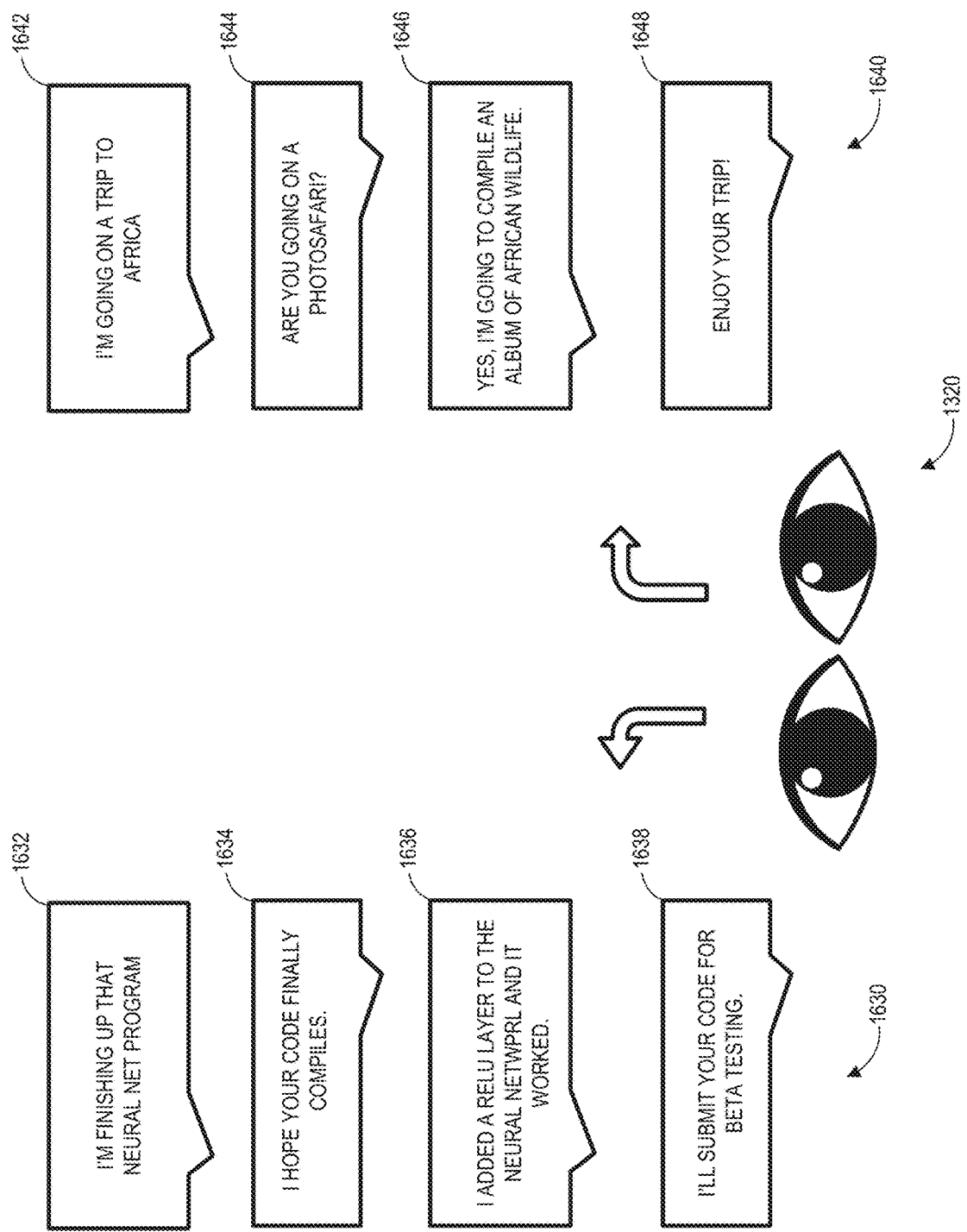

In addition to or in alternative to determining auxiliary information, the AR system can also identify threads in a conversation using keywords. FIGS. 16A and 16B illustrate an example of threads identification based on keywords. In these figures, two users 1328 and 1320 can wear their respective ARDs 1322b and 1322c. The two users 1328 and 1320 can be in a face-to-face conversation or can be in a telepresence session. The two users 1328 and 1320 can also communicate with each other using text messaging (such as, e.g., via a text messaging application).

The speech bubbles 1612, 1614, and 1616, and 1618 illustrate a sequence of sentences spoken by the users 1328 and 1320. These speech bubbles illustrate the content of the conversation between the users 1328 and 1320. The AR system may not present these speech bubbles as visual content to the users 1328 and 1320. The content in the speech bubbles 1612 and 1616 is spoken by the user 1328 and the content in the speech bubbles 1614 and 1618 is spoken by the user 1320. As shown in the speech bubbles 1612, 1614, 1616, and 1618, the conversation between the two users involves two topics: one related to neural network programming and the other one related to the user's 1328 upcoming trip to Africa. However, the two topics are lumped together in both people's speech.

As described in the preceding sections, the AR system 200 can identify that two separate topics exist in the conversation based on keywords. In this example, the AR system can identify one keyword as "neural network" and another keyword as "Africa". Because the keyword "neural network" is related to algorithms and computer programming while the keyword "Africa" describes a geographical region, the AR system 200 may determine that these two keywords are not related to each other, and thus each keyword may be associated with a separate topic. In some situations, even though the AR system has identified multiple keywords, some of the keywords may be associated with the same topic. For example, the AR system can detect one keyword "vacation" and another keyword "beach". The AR system may nevertheless identify one topic because the user may be talking about a vacation on a beach.

Where multiple topics are detected in a conversation, the AR system can separate the topics to create different conversation threads. As shown in FIG. 16B, the conversation between the user 1328 and 1320 in FIG. 16A is separated into two threads 1630 and 1640, where the thread 1630 corresponds to the neutral network conversation and the thread 1640 corresponds to the upcoming Africa trip. The speech bubbles 1632 and 1642 correspond to the speech bubble 1612; the speech bubbles 1634 and 1644 correspond to the speech bubble 1614; the speech bubbles 1636 and 1646 correspond to the speech bubble 1616; and the speech bubbles 1638 and 1648 correspond to the speech bubble 1618.

The AR system can present the conversation as two separate threads to a user (e.g., the user 1320). For example, the thread 1630 can be displayed on the left side of the user's FOV while the thread 1640 can be displayed on the right side of the user's FOV. Different colors or graphics for the text, speech bubbles, etc. may be used to distinguish the different threads. Advantageously, in some embodiments, by separating the conversation into different threads, the user is able to perceive the conversation flow for each topic and reduce confusions in the user's interaction with other users while the user is wearing the ARD. Although two threads are shown in FIG. 16B, this is for illustration, and the number of threads can be greater than two. In some implementations, if the AR system determines the user 1320 is looking at one thread (e.g., the thread 1630), e.g., via analyzing direction of the user's eye gaze, the AR system may de-emphasize the appearance of the other thread (e.g., the thread 1640) by e.g., reducing the brightness or contrast of the thread or not displaying the other thread at all.

In some situations, one (or multiple) threads may have multiple sub-threads. Where each sub-threads may include topics that derive from the thread. For example, while the user 1328 is talking about his upcoming trip to Africa, the user 1328 may say that he plans to surf in Africa. The user 1320 can continue the topic of surfing and discuss surfing equipment and locations. The AR system, upon detecting that the users are discussing surfing, can provide sub-thread for surfing in Africa rather than having an entirely new thread on surfing.

Although the examples described with reference to FIGS. 13A-13G and FIGS. 16A-16B uses speech bubbles and text boxes, these speech bubbles and text boxes are one possible user interface example. The AR system can use a variety of visual graphics to provide present auxiliary information and text threads, e.g., subtitles, banners, etc.

Example Processes of Threads Identification

Figure 17:
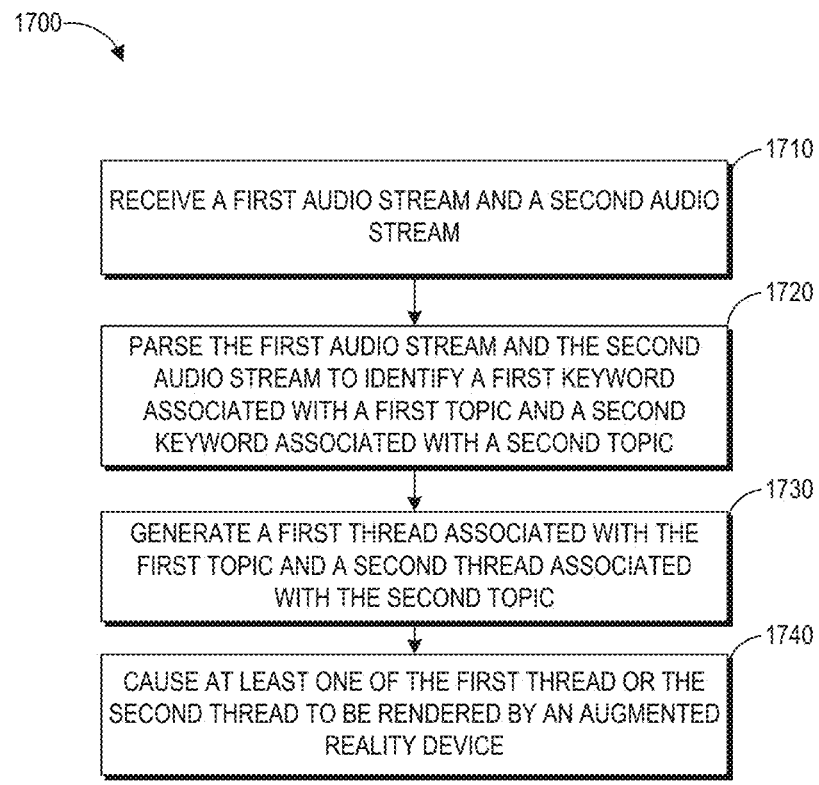
FIG. 17 illustrates an example process of threads identification.

FIG. 17 illustrates an example process of threads identification. The process 1700 may be performed by embodiments of the AR system 200 described herein.

At block 1710, the AR system can receive a first audio stream (e.g., associated with a first person) and a second audio stream (e.g., associated with a second person). In this example, the first person and the second person can converse with each other and the AR system can capture the audio streams spoken by each person. In another example of telepresence, the first person is speaking to the second person who is in a remote location. An audio sensor on the first person's AR system can detect the first person's speech and generate the first audio stream, and an audio sensor on the second person's AR system (or phone) can detect the second person's speech and communicate the second audio stream (e.g., via the network 1290) to the first person's AR system. In some embodiments, either the first person or the second person can be the user of the AR system. In other embodiments, the user may be observing the conversation between the first person and the second person (e.g., watching a debate between the first person and the second person). The AR system can acquire the first audio stream or the second audio streams using the audio sensor 232 or by receiving the audio stream (or the transcribed audio stream) via the network 1290.

At block 1720, the AR system can parse the first audio stream and the second audio stream. Because the conversation between the first person and the second person can involve multiple topics, the AR system can identify a first keyword associated with a first topic and a second keyword associated with a second topic. The keywords can be identified using a variety of techniques described in the preceding sections. In some embodiments, a topic may include more than one keyword.

At block 1730, the AR system can generate a first thread associated with the first topic and a second thread associated with the second topic. The AR system can consolidate portions of the conversation related to the first topic into the first thread and consolidate portions of the conversation related to the second topic into the second thread.

At block 1740, the AR system can cause at least one of the first thread or the second thread to be rendered by an ARD. As illustrated in FIG. 16B, the ARD can render the first thread and the second thread at different display locations in the user's FOV. In some embodiments, the AR system may present only one of two threads. For example, the AR system may present the thread whose associated topic is currently being discussed by the first person and the second person.

Additional Aspects

In a 1st aspect, a method for providing information on a rare word through an augmented reality system, the method comprising: under the control of an augmented reality (AR) system comprising an audio sensor: capturing, via the audio sensor, ambient sounds; detecting presence of speech in the ambient sounds; converting the detected speech to text; detecting a rare word in the converted text; retrieving auxiliary information associated with the rare word; displaying the auxiliary information using the AR system; detecting a condition for dismissing display of the auxiliary information; and dismissing display of the auxiliary information.

In a 2nd aspect, the method of aspect 1, wherein steps from the converting step are performed if the detected speech is within user's environment of a user of the AR system.

In a 3rd aspect, the method of any one of aspects 1-3, wherein a rare word is a word excluded from a common word dictionary.

In a 4th aspect, the method of aspect 3, wherein the common word dictionary is updated to include the rare word.

In a 5th aspect, the method of any one of aspects 1-4, wherein a rare word is a word occurring less frequently than a configurable threshold in a language of interest of a user of the AR system.

In a 6th aspect, the method of any one of aspects 1-5, wherein the rare word is a word in a language foreign to a user of the AR system, and wherein the auxiliary information comprises a translation of the rare word in the user's dominant language.

In a 7th aspect, the method of any one of aspects 1-6, further comprising determining a context of the rare word in the detected speech and retrieving auxiliary information associated with the rare word based on the context.

In an 8th aspect, the method of aspect 7, wherein determining the context is based, at least in part, on words appearing close in time to the rare word in the detected speech.

In a 9th aspect, the method of any one of aspects 1-8, wherein the condition for dismissing display of the auxiliary information is based on a user interface interaction.

In a 10th aspect, the method of aspect 9, where in the user interface interaction is based on eye movements of a user of the AR system.

In an 11th aspect, the method of any one of aspects 1-10, wherein the condition for dismissing display of the auxiliary information is based on a duration of time.

In a 12th aspect, the method of any one of aspects 1-11, wherein the condition for dismissing display of the auxiliary information is based, at least in part, on detection of another rare word.

In a 13th aspect, the method of any one of aspects 1-12, further comprising: detecting a condition for re-displaying a dismissed display of the auxiliary information; and re-displaying a dismissed display of the auxiliary information.

In a 14th aspect, an augmented reality (AR) apparatus for providing information on a rare word, comprising: an AR display; an audio sensor; a non-transitory data store configured to store computer-executable instructions and data; and a hardware processor in communication with the data store, wherein the computer-executable instructions, when executed, cause the processor to: receive audio information detected by the audio sensor; detect speech in the received audio information; detect a rare word in the detected speech; retrieve auxiliary information based on the rare word; and display, using the AR display, the retrieved auxiliary information.

In a 15th aspect, the apparatus of aspect 14, further comprising a communication component for communicating over a communication network, wherein the auxiliary information is retrieved via the communication component through the communication network.

In a 16th aspect, the apparatus of aspect 15, wherein the processor detects the rare word by transmitting detected speech through the communication network to a remote processor for the remote processor to detect the rare word.

In a 17th aspect, the apparatus of any one of aspects 14-16, wherein the audio sensor comprises a plurality of microphones or a directional microphone.

In an 18th aspect, the apparatus of any one of aspects 14-17, wherein the processor is further configured to: determine a source of the detected speech; and detect the rare word and retrieve and display the auxiliary information upon determining the source of the detected speech to be other than a user of the AR apparatus.

In a 19th aspect, the apparatus of any one of aspects 14-18, further comprising a user input device for receiving user interface interactions.

In a 20th aspect, an augmented reality (AR) system for providing information on a rare word, comprising: a first wearable AR device, comprising: an AR display; and an audio sensor; a data store configured to store computer-executable instructions and data; and a processor, wherein the computer-executable instructions, when executed, cause the processor to: receive audio information detected by the audio sensor; detect speech in the received audio information; detect a rare word in the detected speech; retrieve auxiliary information based on the rare word; and display, on the AR display, the retrieved auxiliary information.

In a 21st aspect, the system of aspect 20, further comprising an inward-facing imaging system.

In a 22nd aspect, the system of any one of aspects 20-21, further comprising an outward-facing imaging system.

In a 23rd aspect, the system of aspect 22, wherein the processor uses image information from the outward-facing imaging system to determine a location of a source of the speech relative to a user's environment associated with the first wearable AR device.

In a 24th aspect, the system of aspect 22, wherein the processor is further configured to: use image information from the outward-facing imaging system to determine a location of a source of the speech; and position the display of the auxiliary information close in space to the source of the speech on the AR display without of obscuring a view of the source through the AR display.

In a 25th aspect, the system of any one of aspects 20-24, further comprising: a second wearable AR device, comprising: an AR display; an audio sensor; and a communication component configured to communicate over a communication network; the first wearable AR device, further comprising: a communication component configured to communicate over a communication network; wherein the audio sensor of the first wearable AR device detects audio information, and the retrieved auxiliary information is displayed on the AR display of the second wearable AR device.

In a 26th aspect, a method of identifying a thread in an audio stream, the method comprising: receiving a first audio stream and a second audio stream, parsing the first audio stream and the second audio stream to identify a first keyword associated with a first topic and a second audio stream associated with a second topic; generating a first thread associated with the first topic and a second thread associated with the second topic; and causing at least one of the first thread or the second thread to be rendered by an augmented reality device.

In a 27th aspect, the method of aspect 26, wherein the first audio stream or the second audio stream is from at least one of: a person or an audio-visual content.

In a 28th aspect, the method of any one of aspects 26-27, wherein the first audio stream is from a first person and the second audio stream is from a second person.

In a 29th aspect, the method of any one of aspects 26-28, wherein the first topic further comprises a plurality of sub-topics.

In a 30th aspect, an augmented reality system comprising a hardware processor and an augmented reality display, wherein the hardware processor is programmed to perform any one of aspects 26-29.

In a 31st aspect, an augmented reality (AR) system comprising: an AR display configured to present virtual content to a user of the AR system; an audio sensor configured to capture ambient sounds; and a hardware processor in communication with the AR display and the audio sensor, the hardware processor programmed to: receive the ambient sounds captured by the audio sensor; detect presence of a speech in the ambient sounds; convert the detected speech to text; detect a rare word in the speech; retrieve auxiliary information associated with the rare word; and cause the AR display to render the retrieved auxiliary information.

In a 32nd aspect, the AR system of aspect 31, wherein the rare word is a word excluded from a common word dictionary.

In a 33rd aspect, the AR system of any one of aspects 31-32, wherein the hardware processor is further programmed to: detect a condition for dismissing display of the auxiliary information; and cause the AR display to dismiss the display of the auxiliary information in response to the detected condition.

In a 34th aspect, the AR system of aspect 33, wherein to detect the condition for dismissing the display, the hardware processor is programmed to perform at least one of: determining a threshold period of time has elapsed, detecting another rare word, detecting a pose of a user, or receiving an input from a user input device.

In a 35th aspect, the AR system of any one of aspects 31-34, wherein the hardware processor is further programmed to: determine a source of the detected speech; and detect the rare word and retrieve and display the auxiliary information upon determining the source of the detected speech is associated with a speaker other than a user of the AR display.

In a 36th aspect, the AR system of aspect 35, wherein the source of the detected speech is determined based on at least one of audio information collected from the audio sensor comprising one or more directional microphones or images acquired by an outward-facing imaging system of the AR system.

In a 37th aspect, the AR system of any one of aspects 35-36, wherein to determine the source of the detected speech, the hardware processor is programmed to perform voice recognition on the detected speech to determine an identity of the speaker.

In a 38th aspect, the AR system of any one of aspects 35-37, wherein the source of the detected speech comprises at least one of: another computing in the user's environment, another AR device associated with the speaker, or a person in the user's environment.

In a 39th aspect, the AR system of aspect 38, where the user is in a telepresence session with the speaker and the source of the detected speech is the other user device associated with the speaker, the hardware processor is further programmed to cause the AR display to render a virtual avatar of the speaker and to render the auxiliary information near the virtual avatar of the other user.

In a 40th aspect, the AR system of any one of aspects 35-39, to cause the AR display to render the retrieved auxiliary information, the hardware processor is programmed to determine a location of the source; and render the auxiliary information in a position in the 3D space that is close to the source without obscuring a view of the source through the AR display.

In a 41st aspect, the AR system of any one of aspects 31-40, wherein auxiliary information comprises an explanation of the rare word.

In a 42nd aspect, the AR system of any one of aspects 31-41, wherein the hardware processor is further programmed to: receive an indication from a user to annotate the auxiliary information; initiate storage of an annotation of the auxiliary information; and cause the AR display to render the annotation and the auxiliary information in response to detecting another presence of the rare word.

In a 43rd aspect, a method comprising: under control of an augmented reality (AR) device comprising a hardware processor and an AR display configured to present virtual content in an environment of a user: monitoring the environment of the user of the AR device; detecting presence of an object of interest in the environment based on contextual information associated with at least one of the user or the environment; retrieving auxiliary information for the object of interest; determining a display position of the auxiliary information in a field of view of the user, wherein the field of view comprises a portion of the environment which a user can perceive at a given time; and causing the AR display to render the auxiliary information at the display position.

In a 44th aspect, the method aspect 43, wherein the object of interest comprises a keyword, a physical object, or a person.

In a 45th aspect, the method of aspect 44, where the object of interest comprises a keyword, detecting the presence of the object of interest comprises: detecting a speech from ambient sounds in the environment; and parsing the speech to identify a rare word.

In a 46th aspect, the method of any one of aspects 43-45, wherein monitoring the environment comprises at least one of: capturing and analyzing ambient sounds of the environment; or acquiring images of the environment.

In a 47th aspect, the method of any one of aspects 43-46, wherein the contextual information is associated with the user's past experience and the object of interest is comprises an object which the user rarely encounters.

In a 48th aspect, the method of any one of aspects 43-47, wherein the auxiliary information comprises at least one of: product information associated with the object of interest or an explanatory text of the object of interest.

In a 49th aspect, the method of any one of aspects 43-48, further comprising: receiving an indication from the user to annotate the auxiliary information; initiating storage of an annotation of the auxiliary information; and causing the AR display to render the annotation and the auxiliary information in response to detecting another presence of the object of interest.

In a 50th aspect, the method of any one of aspects 43-49, wherein determining a display position of the auxiliary information comprises: determining a location of the object of interest; and identifying the display position as a position in the environment that is close to the object of interest without obscuring a view of the object of interest through the AR display.

Other Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations or embodiments shown herein, but are to be accorded the widest scope consistent with this disclosure, the principles and the novel features disclosed herein.

Certain features that are described in this specification in the context of separate implementations or embodiments also can be implemented in combination in a single implementation or embodiment. Conversely, various features that are described in the context of a single implementation or embodiment also can be implemented in multiple implementations or embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An augmented reality (AR) system comprising:
   an AR display configured to present virtual content to a user of the AR system;
   an audio sensor configured to capture ambient sounds; and
   one or more hardware processors in communication with the AR display and the audio sensor, the hardware processor programmed to:
      receive the ambient sounds captured by the audio sensor;
      detect presence of a speech in the ambient sounds;
      convert the detected speech to text;
      parse the text to recognize one or more words;
      detect a rare word in the recognized one or more words;
      in response to lack of a display stopping condition associated with the rare word:
         retrieve auxiliary information associated with the rare word; and
         cause the AR display to render the retrieved auxiliary information; and
      in response to detection of a display stopping condition associated with the rare word, suppress rendering of auxiliary information by the AR display.

2. The AR system of claim 1, wherein the display stopping condition comprises a condition to suppress display of auxiliary information associated with the rare word.

3. The AR system of claim 1, wherein the display stopping condition comprises a threshold number of detections of the rare word within a period of time.

4. The AR system of claim 3, wherein at least one of the threshold number of detections or the period of time is user configurable.

5. The AR system of claim 1, wherein the rare word is a word excluded from a common word dictionary.

6. The AR system of claim 1, wherein to detect the display stopping condition, the hardware processor is programmed to perform at least one of: determining a threshold period of time has elapsed, detecting another rare word, detecting a pose of a user, or receiving an input from a user input device.

7. The AR system of claim 1, wherein the hardware processor is further programmed to:
   determine a source of the detected speech; and
   detect the rare word and retrieve and display the auxiliary information upon determining the source of the detected speech is associated with a speaker other than a user of the AR display.

8. The AR system of claim 7, wherein the source of the detected speech is determined based on at least one of audio information collected from the audio sensor comprising one or more directional microphones or images acquired by an outward-facing imaging system of the AR system.

9. The AR system of claim 7, wherein to determine the source of the detected speech, the hardware processor is programmed to perform voice recognition on the detected speech to determine an identity of the speaker.

10. The AR system of claim 7, wherein the source of the detected speech comprises at least one of: another computing device in the user's environment, another AR device associated with the speaker, or a person in the user's environment.

11. The AR system of claim 10, where the user is in a telepresence session with the speaker and the source of the detected speech is the other AR device associated with the speaker, the hardware processor is further programmed to cause the AR display to render a virtual avatar of the speaker and to render the auxiliary information near the virtual avatar of the other user.

12. The AR system of claim 7, to cause the AR display to render the retrieved auxiliary information, the hardware processor is programmed to determine a location of the source; and render the auxiliary information in a position that is close to the source without obscuring a view of the source through the AR display.

13. The AR system of claim 1, wherein auxiliary information comprises an explanation of the rare word.

14. The AR system of claim 1, wherein the hardware processor is further programmed to:
receive an indication from a user to annotate the auxiliary information;
initiate storage of an annotation of the auxiliary information; and
cause the AR display to render the annotation and the auxiliary information in response to detecting another presence of the rare word.

15. A method comprising:
under control of an augmented reality (AR) device comprising a hardware processor and an AR display configured to present virtual content in an environment of a user:
monitoring the environment of the user of the AR device;
detecting presence of an object of interest in the environment based on contextual information associated with at least one of the user or the environment;
determining a quantity of times the object of interest has been detected within a predefined time period; and
in response to determining that the quantity of times is less than a display stopping threshold quantity:
retrieving auxiliary information for the object of interest;
determining a display position of the auxiliary information in a field of view of the user, wherein the field of view comprises a portion of the environment which a user can perceive at a given time; and
causing the AR display to render the auxiliary information at the display position.

16. The method of claim 15, wherein at least one of the threshold quantity or the predefined time period is user configurable.

17. The method of claim 15, where detecting the presence of the object of interest comprises:
detecting a speech from ambient sounds in the environment; and
parsing the speech to identify a rare word.

18. The method of claim 15, wherein monitoring the environment comprises at least one of:
capturing and analyzing ambient sounds of the environment; or
acquiring images of the environment.

19. The method of claim 15, wherein the auxiliary information comprises an explanatory text of the object of interest.

20. The method of claim 15, further comprising:
receiving an indication from the user to annotate the auxiliary information;
initiating storage of an annotation of the auxiliary information; and
causing the AR display to render the annotation and the auxiliary information in response to detecting another presence of the object of interest.

21. The method of claim 15, wherein determining a display position of the auxiliary information comprises:
determining a location of the object of interest; and
identifying the display position as a position in the environment that is close to the object of interest without obscuring a view of the object of interest through the AR display.

* * * * *